United States Patent
Polo

(10) Patent No.: US 10,460,350 B2
(45) Date of Patent: Oct. 29, 2019

(54) DIGITAL CONCIERGE APPLICATION

(71) Applicant: Visa International Service Association, San Francisco, CA (US)

(72) Inventor: Andres Polo, Miami, FL (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/732,166

(22) Filed: Dec. 31, 2012

(65) Prior Publication Data

US 2013/0173390 A1 Jul. 4, 2013

Related U.S. Application Data

(60) Provisional application No. 61/581,980, filed on Dec. 30, 2011.

(51) Int. Cl.
*G06Q 30/00* (2012.01)
*G06Q 30/02* (2012.01)
*G06T 1/00* (2006.01)

(52) U.S. Cl.
CPC ......... *G06Q 30/0261* (2013.01); *G06Q 30/02* (2013.01); *G06Q 30/0244* (2013.01); *G06Q 30/0277* (2013.01); *G06T 1/0021* (2013.01); *G06T 1/0064* (2013.01)

(58) Field of Classification Search
None
See application file for complete search history.

(56) References Cited

U.S. PATENT DOCUMENTS

| | | | | |
|---|---|---|---|---|
| 6,159,095 A | * | 12/2000 | Frohm | G07F 17/32 273/269 |
| 7,050,818 B2 | | 5/2006 | Tendler | |
| 7,159,005 B1 | * | 1/2007 | Baber | H04L 67/06 709/200 |
| 7,596,515 B2 | | 9/2009 | Eckel, Jr. | |

(Continued)

OTHER PUBLICATIONS

Christoph Gruen; Assissting Tourists on the Move; 2008; IEEE 7th International Conference on Mobile Business; 2008; p. 171-180.*

(Continued)

*Primary Examiner* — Radu Andrei
(74) *Attorney, Agent, or Firm* — Kilpatrick Townsend & Stockton LLP

(57) ABSTRACT

Embodiments of the invention are directed to methods, systems, and apparatuses for providing digital concierge services through a portable electronic device. The digital concierge may be provided through an application installed on a portable electronic device that is configured to contact a concierge service, provide filtered and relevant offers including promotions and accountholder benefits, and provide ATM location services for users as they travel. One embodiment of the present invention is directed to a method comprising determining a location of a portable electronic device, receiving concierge data associated with the user, filtering, by a processor, a plurality of offers according to the location of the portable electronic device and the concierge data associated with the user, and presenting filtered offers to a user. Some embodiments may further filter the plurality of offers according to an issuer associated with the user of the portable electronic device.

20 Claims, 12 Drawing Sheets

(56) References Cited

U.S. PATENT DOCUMENTS

| | | |
|---|---|---|
| 7,599,847 B2 | 10/2009 | Block et al. |
| 7,848,358 B2 | 12/2010 | LaDue |
| 7,904,100 B2 | 3/2011 | Pohutsky et al. |
| 8,160,614 B2* | 4/2012 | Shaffer ............... H04L 67/18 |
| | | 455/456.1 |
| 8,452,706 B1* | 5/2013 | Moadus ............... G06Q 40/02 |
| | | 705/40 |
| 8,472,924 B2* | 6/2013 | Watson ............... H04L 12/1822 |
| | | 455/414.1 |
| 8,718,614 B2* | 5/2014 | Kolodziej ............ H04W 4/029 |
| | | 455/414.1 |
| 8,731,984 B2* | 5/2014 | Rodriguez ........... G06Q 10/025 |
| | | 705/7.11 |
| 2002/0178126 A1* | 11/2002 | Beck .................. A61B 5/0002 |
| | | 705/75 |
| 2006/0041847 A1* | 2/2006 | Maw .................. G06F 3/0483 |
| | | 715/793 |
| 2006/0046740 A1 | 3/2006 | Johnson |
| 2007/0032247 A1 | 2/2007 | Shaffer et al. |
| 2007/0192277 A1 | 8/2007 | Jackson |
| 2007/0287473 A1 | 12/2007 | Dupray |
| 2008/0247517 A1 | 10/2008 | Huey |
| 2009/0150218 A1* | 6/2009 | Brunner .............. G06Q 30/02 |
| | | 705/14.58 |
| 2009/0241066 A1* | 9/2009 | Costello ............. G06Q 30/02 |
| | | 715/843 |
| 2009/0245184 A1* | 10/2009 | Torres ............... H04W 4/21 |
| | | 370/329 |
| 2010/0197323 A1 | 8/2010 | Freeburg et al. |
| 2010/0268570 A1 | 10/2010 | Rodriguez et al. |
| 2011/0022424 A1 | 1/2011 | VonDerheide |
| 2011/0071865 A1* | 3/2011 | Leeds ................. G06Q 10/025 |
| | | 705/6 |
| 2011/0071893 A1* | 3/2011 | Malhotra ............ G06Q 10/109 |
| | | 705/14.23 |
| 2012/0173366 A1* | 7/2012 | Soroca ............... G06Q 30/02 |
| | | 705/26.3 |
| 2013/0103496 A1* | 4/2013 | Shekar .............. G06Q 30/0201 |
| | | 705/14.53 |
| 2013/0151405 A1* | 6/2013 | Head ................. G06Q 20/36 |
| | | 705/41 |
| 2013/0218682 A1 | 8/2013 | Alterman et al. |
| 2013/0254107 A1* | 9/2013 | McClure ............ G06Q 40/00 |
| | | 705/42 |
| 2014/0059496 A1* | 2/2014 | White ................ G06F 3/0488 |
| | | 715/841 |
| 2014/0074585 A1* | 3/2014 | Madsen ............. G06Q 30/0239 |
| | | 705/14.39 |
| 2014/0149884 A1* | 5/2014 | Flynn, III .......... G06Q 10/10 |
| | | 715/752 |
| 2015/0178107 A1* | 6/2015 | Gummaraju ........ G06F 9/45558 |
| | | 718/1 |

OTHER PUBLICATIONS

Liu Zhongxiu; Electronic Commerce Application in Tourism Agents; 2012; IEEE; 2012; p. 828-831.*

"Shopping Apps Top Banks 'To-Do' List" by Johnson and Sausner—Bank Technology News published on Jul. 1, 2010, 3 pages.

"Looterang Launches New App for iPhone and Droid" by PR Newswire published on Dec. 2, 2011, 2 pages.

Non-Final Office Action dated Aug. 15, 2014 for U.S. Appl. No. 13/841,610, 18 pages.

Non-Final Office Action dated Dec. 4, 2014 for U.S. Appl. No. 13/841,610, 14 pages.

Final Office Action dated Jun. 4, 2015 in U.S. Appl. No. 13/841,610, filed Mar. 15, 2014, 19 pages.

Anand Agarawala, "Enriching the Desktop Metaphor with Physics, Piles and the Pen", 2006, 102 pages.

Final Office Action dated May 3, 2016 in connection with U.S. Appl. No. 13/841,610, 29 pages.

Non-Final Office Action dated Nov. 18, 2015 in connection with U.S. Appl. No. 13/841,610, 25 pages.

* cited by examiner

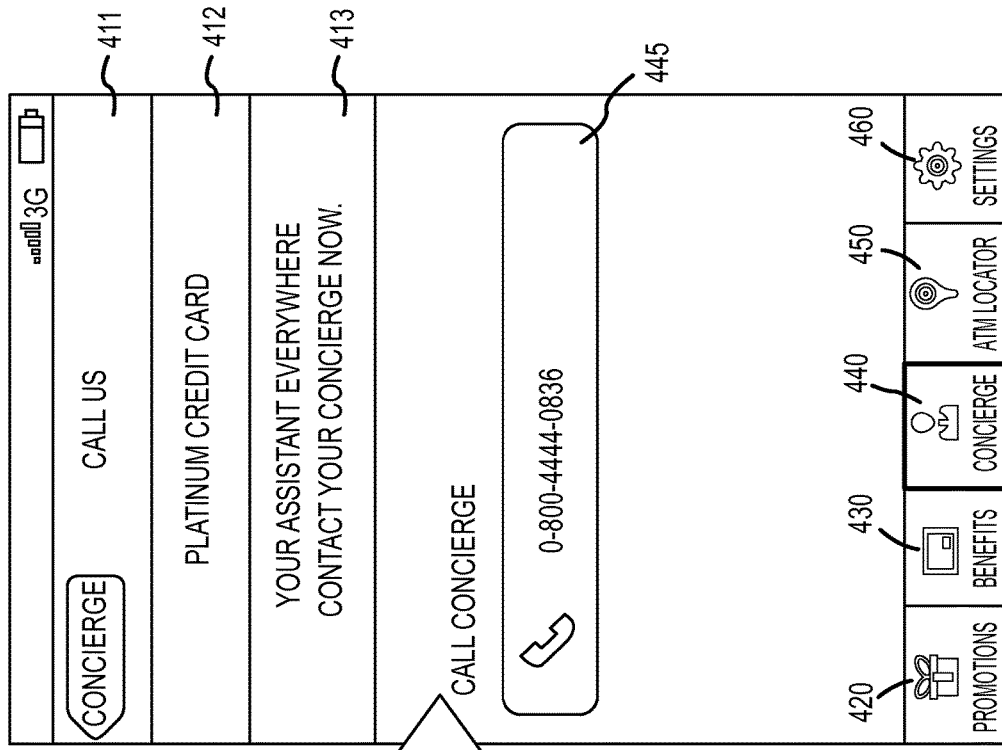
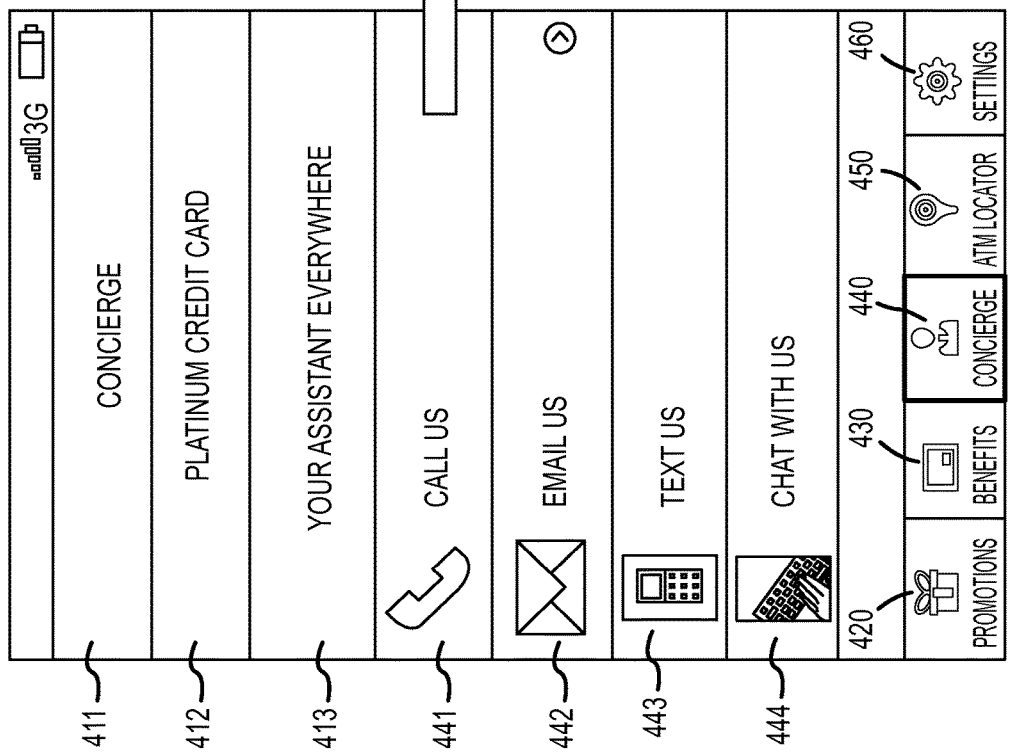
FIG.5A
FIG.5B

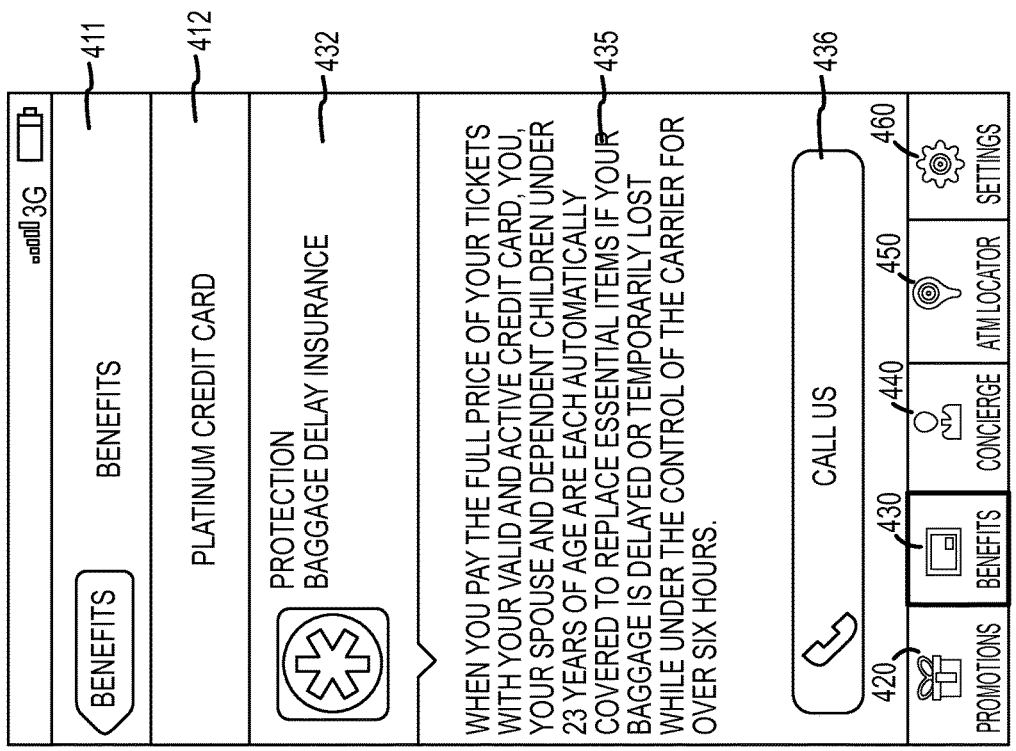
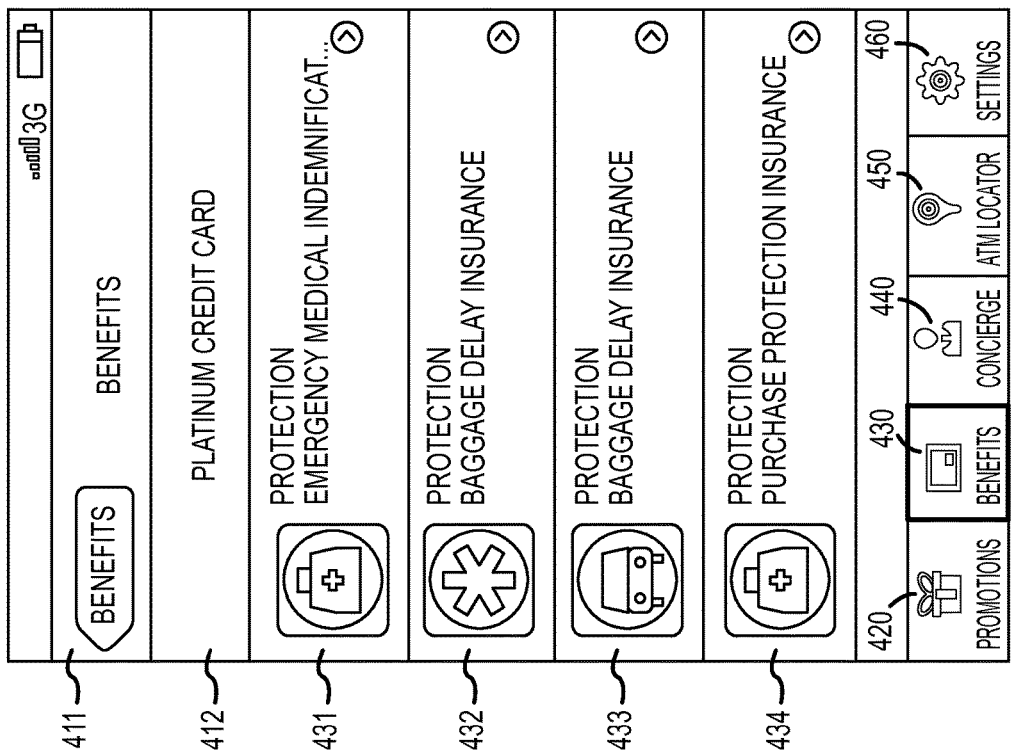
FIG.8A
FIG.8B

DIGITAL CONCIERGE APPLICATION

CROSS-REFERENCES TO RELATED APPLICATIONS

This application claims the benefit of U.S. Provisional Application No. 61/581,980, filed Dec. 30, 2011, which is herein incorporated by reference in its entirety for all purposes.

BACKGROUND

The use of concierge services by business and vacation travelers has increased as people have become busier and consumer options for travel arrangements have become more complicated and expansive. Accordingly, some issuers and payment processing networks provide concierge services to their account holders as a value add service. Travelers may use the concierge services to plan dinners, lodging, and entertainment that they may experience while they are in a new city or region. Additionally, some issuers and payment processing networks provide specific products (e.g., special cards, accounts, etc.) focused on the needs and desires of business travelers. For example, an issuer may provide a travel card that provides particular travel oriented deal, discounts, or benefits, in order to attract business travelers or vacationers to sign up for that account or card product.

Typically, a concierge service may have special arrangements with merchants and service providers which allow them to provide special discounts and promotions to traveling members that are arranging their travel through the concierge service. However, it may be difficult for a concierge to inform a user of all of the special promotions and discounts that may be available to a user. Accordingly, there may be a need for an easy and efficient manner for a user to review the current promotions and coupons that are available for a particular geographic area through the concierge service.

Additionally, in the past there have been limited ways for a traveler to easily and quickly receive the services provided by a concierge while traveling. Furthermore, it may be difficult to find the correct concierge to contact for a given situation as a traveler may contact one concierge to book travel in one country, and a different concierge or customer service representative to address a problem while in another country. Furthermore, the user may be out of contact with a concierge service during a flight or if there is limited connection to a communications network while traveling in remote areas. Accordingly, travelers may not be able to plan their future activities or get access to their travel information while traveling.

Smartphones and other portable electronic device have grown in popularity and use in recent years. Additionally, communications networks have expanded rapidly and the portable electronic devices may have access to a number of different communications networks (e.g., the Internet, cellular communications networks, etc.) throughout the world. As consumers travel to new countries, regions, and cities, they bring their portable electronic devices with them and use these devices around the world.

Accordingly, there is a need for an application or module that may operate on a portable electronic device and provide information to a user while they are traveling and allow quick and easy access to a concierge service, promotions, accountholder benefit information, and ATM location information no matter where the user is located in the world.

Additionally, there is a need for users to have better access to local and specialized deals that are relevant to the consumer's current travel, spending habits, and issuer products, as they travel.

Embodiments of the present invention address these problems and other problems individually and collectively.

BRIEF SUMMARY

The present application is generally related to delivering services, promotions, and information to cardholders using portable electronic devices. Specifically, embodiments of the present application are directed at a digital concierge application that may operate on a portable electronic device that provides location-based concierge services, information regarding accountholder or cardholder benefits, location and account-based promotions, and an ATM locator service to a cardholder (i.e., user). Accordingly, the digital concierge application may provide a traveling concierge service where a user's portable electronic device may become a digital concierge where a user may plan their activities, find and redeem local promotions, receive and redeem accountholder benefits, find relevant ATM locations near them, and have access to important account information, all while traveling using a single device.

One embodiment of the present invention is directed to a method comprising determining a location of a portable electronic device, receiving concierge data associated with the user, filtering, by a processor, a plurality of offers according to the location of the portable electronic device and the concierge data associated with the user, and presenting filtered offers to a user. Some embodiments may further filter the plurality of offers according to an issuer associated with the user of the portable electronic device.

Another embodiment of the present invention is directed to a portable electronic device comprising a processor and a non-transitory computer readable medium comprising computer code for performing a method. The method comprising determining a location of a portable electronic device, receiving concierge data associated with the user, filtering a plurality of offers according to the location of the portable electronic device and the concierge data associated with the user, and presenting filtered offers to a user.

These and other embodiments of the invention are described in further detail below.

BRIEF DESCRIPTION OF THE DRAWINGS

FIGS. 5A-5B show exemplary embodiments of a graphical user interface associated with a concierge module on a portable electronic device according to one embodiment of the invention.

FIGS. 7A-7B show exemplary embodiments of a graphical user interface associated with a promotions service module on a portable electronic device according to one embodiment of the invention.

FIGS. 8A-8B show exemplary embodiments of a graphical user interface associated with an accountholder benefits service module on a portable electronic device according to one embodiment of the invention.

DETAILED DESCRIPTION

Figure 1:
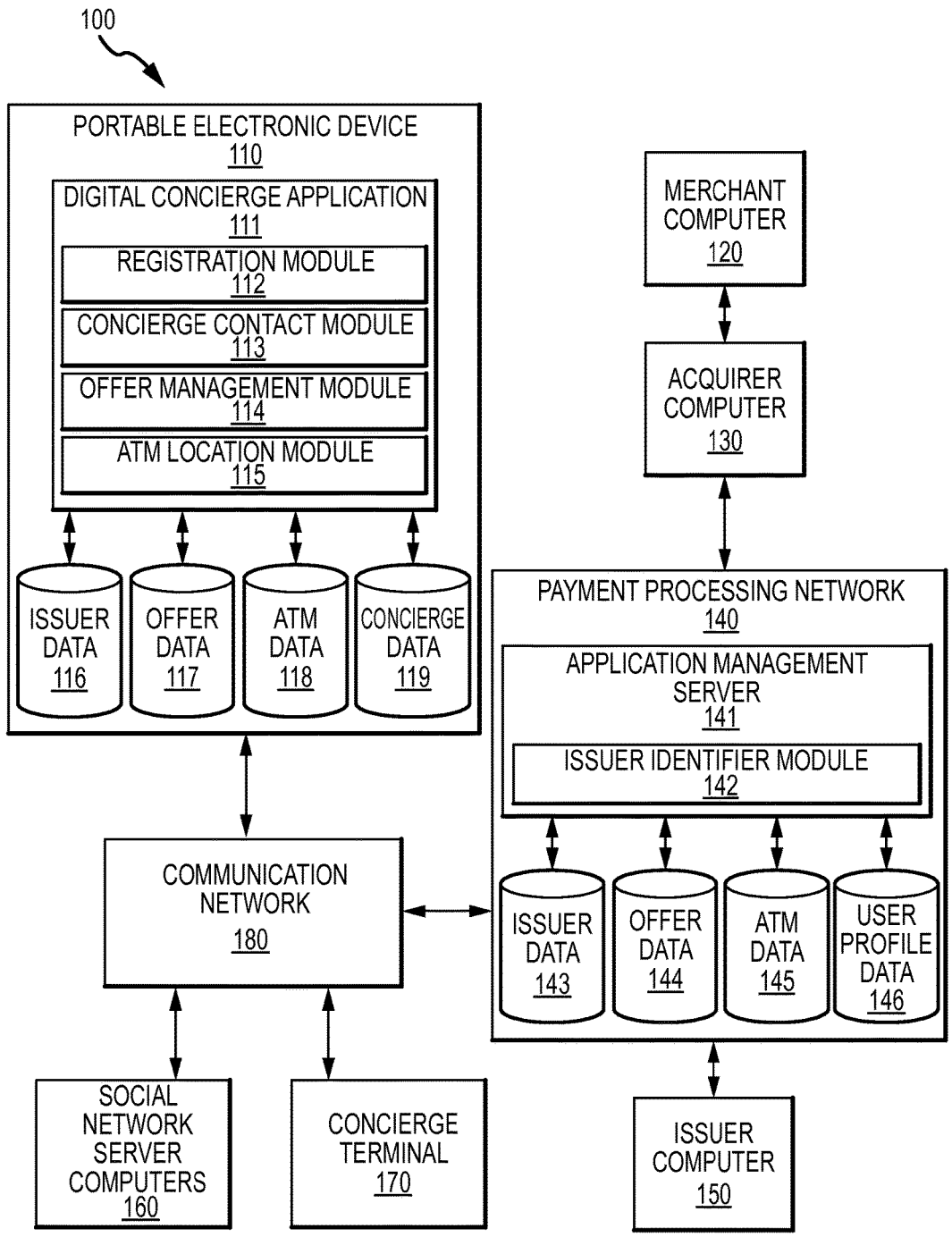
FIG. 1 shows an exemplary block diagram of a system according to one embodiment of the invention.

Embodiments of the invention are directed to systems and methods of facilitating the automatic delivery of products, information, and services direct to a consumer's portable electronic device. Embodiments of the invention may provide easy and secure access to location and issuer filtered offers and promotions, concierge service representatives, product or benefit information, customer service, and ATM locations. The application may provide one-click or one-touch access to location filtered promotions, products, and services to a user, based on that user's personal registration details provided during an initial registration with the service. Additionally, embodiments of the invention may update the promotions by location of the portable electronic device to provide the most pertinent promotions to the user. Furthermore, embodiments of the invention may also filter promotions or offers by the issuer of the card or product, as well as by concierge data generated in response to interactions with a concierge representative or system. Accordingly, embodiments of the invention may enable financial institutions, issuers, and/or payment processing services to target products, information, and services direct to their users using a concierge module, promotions module, account holder benefit module, and an ATM locator module. These modules may be provided through an application installed on a portable electronic device and may provide a number of services and functionality as may be described in further detail below. The information associated with these modules can be automatically updated and cached (i.e., stored) on the portable electronic device so that it is available even if the electronic device does not have a data or cellular network connection to a communications network.

As explained above, the digital concierge application may comprise a plurality of modules including a concierge module, a promotions module, an accountholder benefits module, and an ATM locator module. The concierge module may provide connections to a local concierge service representative including one-click calling, emailing, and interacting through chat or SMS texting services. Additionally, in some embodiments, the concierge module may allow for the booking of travel or other concierge duties without the interaction with a human concierge. The promotions module may provide links to promotions with information provided from the service provider (e.g., merchant, issuer, payment processing service, etc.) related to the promotion. The account or cardholder benefits module may provide a quick guide to card enhancements (e.g., insurance, assistance, etc.) or other account related information including quick access (one-click calling, emailing, or texting) to a customer service representative. Finally, the ATM locator module may provide the ability to search for the nearest ATM quickly and easily and may provide a map with directions to find a selected ATM.

One of the many advantages provided by the system is the quick and easy access to the offers, promotions, benefits, and services provided by financial institutions (e.g., issuers, banks, and payment processing networks). Grouping the individual functions described above through modules on a single application in a portable electronic device provides further advantages than each feature provides individually. A synergistic effect results from the interaction of the features provided by the modules such that the modules combined into a single device can provide further advantages for the users and service providers than they could individually.

For example, location based and issuer specific offers can be provided based on an itinerary that is provided to a concierge through the application's email concierge feature. For instance, if a cardholder's itinerary (that may have been booked through the application using the concierge module) suggests that the user may be traveling to Boston, then promotions or suggestions for discounted services or goods (issuer and/or geographically based) in the suggested location can be provided to the user. Additionally, the application may suggest accountholder or cardholder benefits that may be useful for the trip (e.g., baggage loss insurance). The entire process can be coordinated through the application which provides an easier and more efficient method for a user to keep track of offers and be informed as to what offers are available in a location they may not be familiar with. This may lead to more offers being accepted by users, leading to more customer loyalty with the issuer or payment processor system. Additionally, issuers or payment processors may develop relationships with select merchants in travel destinations such that merchants may incentivize travelers to visit their stores or services while traveling. Accordingly, the offers may be used to advertise the presence, goods, and services provided by a particular merchant or service provider.

Furthermore, all the data related to the offers including promotions and cardholder (or accountholder) benefits may be stored and easily accessible on the portable electronic device for easy referencing. Additionally, in some embodiments, the issuer specific and location specific offers can be presented to a user no matter where they travel without the user having to communicate with a live concierge representative. Some embodiments may allow users to redeem offers (either promotions or account benefits), schedule services (e.g., flights, hotels, etc.), buy tickets, create dinner reservations, or any other activities that a concierge representative may complete, using the digital concierge application. Accordingly, the application may provide services much like a digital concierge service by providing the services of a typical concierge through a single application without requiring the interaction of a human being.

Embodiments of the invention provide the technical advantages of providing information to users even when there is no connection to the source of the information and limiting unnecessary data transfer. The application continually updates information related to promotions and offers, local concierge contacts, and other information important to a user and stores the data so that the data can be accessed whether or not the user's portable electronic device has a data connection. For example, when a user is traveling and the concierge has notice of the travel (through access to an itinerary, by booking the travel through the concierge, or by use of the global positioning service (GPS) location of the portable electronic device) the user can have local promotions and offers updated on their phone prior to traveling on the plane so that the user can review the information even though the user may not have cellular or data connection.

Furthermore, the account or cardholder benefits that may apply to the registered account can be present for reference by the user at any time without the need for a cellular or data connection. Therefore, no continual connection is required to receive information from the issuer and/or local service providers (or merchants) of services or goods. Accordingly, the application provides the additional benefit of not requiring an update of the information every time the user wishes to view the information. Alternatively, the user can opt for the information to only be updated when they manually agree to the update. Furthermore, if no promotions or benefits information has updated on the application management server (such as the GPS information for the portable electronic device is from the same city or state as previously updated and there are no new offers available in that area) then there is no need to update the offer information on the portable electronic device as it is already stored. This can limit unnecessary transmissions of data between the servers and portable electronic device.

Embodiments of the invention may be implemented in the form of an application programmed for the operating systems of many different portable electronic devices. The application may be available in many different languages with an initial language setting based on the language primarily spoken in the country or region in which the application is originally downloaded. The user may be provided the option to change the language settings in the application settings menu. The application may also be co-branded such that an account issuer may include their brand on the application along with the payment processing service or other banking entity involved with providing the card. A logo or logos of one or both of the co-branded companies may appear on the home screen as well as the other screens of the application. Furthermore, there could be optional cardholder benefits provided for particular products or issuers as well as that issuers personalized contact information and offers.

Embodiments of the invention may focus on affluent or wealthy cardholders. The application may focus on affluent cardholders because they are the cardholders that most regularly use the promotions, cardholder benefits, and concierge services provided by the application. Affluent cardholders may also travel more and have bigger budgets to spend while traveling. Furthermore, affluent cardholders may need the additional concierge and offer support while traveling. However, the embodiments of the invention could be tailored to any income level and are not limited to affluent cardholders. Therefore, the application could be used with any card product level (the numbers of dollars spent every year may determine the product offered to the user).

Prior to discussing exemplary embodiments of the invention, a further description of some terms can be provided for a better understanding of the invention.

A "portable electronic device" may include any electronic device that may be transported and operated by a user. In some embodiments the portable electronic device may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of portable electronic devices include mobile phones (e.g., cellular phones), PDAs, tablet computers, net books, laptop computers, personal music players, hand-held specialized readers, etc. A portable electronic device may comprise any suitable hardware and software for performing such functions, and may also include multiple devices or components (e.g., when a device has remote access to a network by tethering to another device—i.e., using the other device as a modem—both devices taken together may be considered a single portable electronic device). A portable electronic device may also comprise a verification token in the form of, for instance, a secured hardware or software component within the portable electronic device and/or one or more external components that may be coupled to the portable electronic device. A detailed description of an exemplary portable electronic device is provided below.

As used herein, "concierge data" may include any information associated with a concierge. For example, concierge data may be any information that is generated as a result of a user contacting a concierge. For instance, concierge data may include a travel itinerary, service request, service response, reservation information associated with a dinner or hotel stay, etc. Additionally, concierge data may be associated with a user such that the itinerary is related to the user's travel. For example, if a user contacts a concierge service representative (using the digital concierge application or not) and plans a trip including hotel and travel arrangements using the concierge, the concierge may send the user an itinerary including information related to the user's hotel and travel arrangements. The hotel and travel arrangements may be separate, such that the concierge data includes two separate communications from the concierge service or concierge service representative or all of the information may be included in a single communication.

Furthermore, the concierge data may include a small amount of information (e.g., a code related to a particular location and time for travel) or a large amount of information (e.g., a full itinerary including addresses, contact information, and details regarding every facet of the trip). For example, in some embodiments, the digital concierge application may receive a full itinerary from a concierge service computer (i.e., terminal) including information related to when, where, and what restaurants, hotels, or businesses the user is scheduled to eat, sleep, and/or visit during their trip. The itinerary may be interpreted by the digital concierge application to identify when and where the user may be located at any given time, so that offers may be filtered accordingly. As such, the concierge data may impact the relevance scoring of offers during a filtering process as will be discussed in further detail below. Any suitable manner of interpreting the data may be implemented (e.g., the concierge module may map itinerary on a timeline and preprogram the offer filtering according to the timeline, or through any alternative method).

Additionally, the concierge data may include information related to a problem, a service request by a user, or a service report from the concierge. For example, if a user contacts a concierge service representative to report their baggage is missing or other problems related to their travel, the concierge representative may generate a service report and send the service report to the portable electronic device. The service report may include information related to the problem including contact information for redeeming a prior received benefit related to the service issue. Accordingly, the offer management module may use the concierge data including the service request or report to help filter relevant cardholder or accountholder benefits to the user related to the service problem or other service problems that may be encountered by users in similar situations.

Alternatively, the concierge data may be as simple as an indicator of what region, city, or state the user may be visiting, the date or time of the trip, and/or the duration of the trip. For example, in some embodiments, the concierge data may include a region indicator for each country, region, state, and/or city that the application may use to filter offers including promotions and account or cardholder benefits. For instance, if the user uses a concierge to plan a trip to New York City, New York, in one week, the concierge service representative may send concierge data including a country indicator (e.g., country code 001), a region indicator (e.g., region code 01 for that country), a city indicator (e.g., city code 01 in that region), a departure indicator in a number of days until the user departs (e.g., 07), and a duration indicator in a number of days the user may be present (e.g., 04). As such, the concierge data could include a code as simple as "00101010704," related to the location and time that a user will be present in a location.

Similarly, in embodiments of the present invention where a present connection to a cellular communication network exists, the current geographic location may be determined by identifying a Mobile Network Code (MNC) and Mobile Country Code (MCC) for the portable electronic device. A MNC is an indicator for the mobile network operator and a MCC is an indicator for the mobile country. Accordingly, location may be determined using a mobile country code to narrow the user's location to a country and a MNC to limit to a particular mobile network operator. Additionally, in some embodiments, offer data may be organized according to MCC and MNC so that only those offers in a particular country may be provided to a portable electronic device. Furthermore, the MNC and MCC may be used for any of the modules and is not limited to offers related services. Accordingly, the MNC could be used when determining a local concierge service or in finding ATM locations.

However, codes do not have to be used in embodiments of the present invention, for example, the application may simply use the location of the portable electronic device to indicate when the user may be leaving the area. Accordingly, the application may use concierge data to determine a destination city or region when the location data associated with the portable electronic device indicates that the user is leaving the area. Any other suitable method of determining when, where, and how long a user is traveling may be implemented. For example, the concierge data may be used to generate a calendar that the application uses to determine what location to use in filtering offers for at a particular time.

In some embodiments, "concierge service contact information" may include any information for contacting a concierge service. For example, the concierge service contact information may include a phone number, email address, live chat connection address and relevant application programming interfaces (APIs), or server computer address in order to contact a concierge service. The concierge service contact information may be determined through any suitable means. In some embodiments, the concierge service contact may be determined using the location of the portable electronic device. For example, depending on the location of the portable electronic device, the correct concierge service provider may change.

It may be beneficial to have a concierge that is familiar with the local area when a user is contacting them. Accordingly, the concierge service contact information may change depending on the location of the portable electronic device. Additionally, the concierge contact module of the digital concierge application may comprise concierge service contact information for concierge services throughout the world. Alternatively, in some embodiments, the digital concierge module may contact the concierge service and provide the location of the portable electronic device as well as the preferred method of contacting the concierge. A concierge service server computer may then respond with the appropriate concierge service contact information, a live chat program that may be installed or operated on the portable electronic device, or a response that the concierge service cannot service the area. Any other suitable method for determining the correct concierge service provider information may be implemented. In embodiments of the present invention, the portable electronic device may present contact options to the user to connect to the concierge service and depending on the type of contact option selected, may contact the concierge service using the selected method.

An "offer" may include any information related to a service or product. For example, an offer may include media and non-media marketing communications employed for a pre-determined, limited time, or indefinitely to increase consumer demand, stimulate market demand, or improve product availability. In embodiments of the present invention, offers may include information related to promotions associated with merchants or service providers, as well as cardholder or accountholder benefits. Examples of offers include promotions, contests, coupons, premiums, prizes, discounts, rebates, and/or the like associated with one or more merchants or service providers, as well as information related to cardholder or accountholder benefits that may already be provided or are available to an accountholder. For instance, offers may include a promotion providing a 10% discount on purchases made at a department store for a particular day. Alternatively, an offer may include information regarding baggage loss insurance, flight cancelation insurance, or any other potential accountholder benefits or programs that may be offered by an issuer, payment processing network, or service provider.

In some embodiments of the present invention, offers may be updated periodically, at the occurrence of a predetermined event, or at any other suitable time. Any suitable method of updating offers on the portable electronic device may be implemented. For example, in one embodiment, the application may send a request for updated offers to a server computer in response to a predetermined event. The predetermined event may include any suitable activity related to the portable electronic device or digital concierge application including, for example, the launching of the application, powering on the portable electronic device, or lapsing of a predetermined period of time since the last update.

An offer management module of the digital concierge application may manage the update process of offers. The offer management module may receive the updated offers from an application management server operated by the application provider in response to a request, may compare the updated offers to the offers already stored on the portable electronic device, may update the plurality of stored offers with the updated offers, and may store the updated plurality of offers on the portable electronic device. Any other suitable method of updating offers including promotions and accountholder benefits may be implemented.

Additionally, in some embodiments, the user may agree to, redeem, or otherwise accept an offer presented by the application using the application. For example, in some embodiments, the application may send a selected offer to an application management server computer, wherein the server computer may redeem the offer for the user by communicating with a merchant associated with the selected offer.

In some embodiments, a user may also share an offer with friends, colleagues, family, or any other contacts through communication with various social network systems or by directly contacting the person through a communications network. Accordingly, embodiments of the present invention may be configured to send a selected offer and user information to a social media network server and the social media network server may thereafter share the selected offer with other social media network users associated with the user.

In some embodiments, "determining a location of a portable electronic device" may include any method of determining the geographic location of a portable electronic device. Any suitable method may be implemented. For example, a location may be determined through the use of a global positioning system (GPS) receiver or GPS chip within the portable electronic device that may indicate the latitude and longitude of the portable electronic device whenever the portable electronic device may receive a GPS communication signal from one or more satellites. Additionally, the application may determine the location by triangulating the location of cellular network communication towers, through the reporting of a location by a monitoring system, monitoring the signal strength and proximity to a cellular communications tower, or through any other suitable manner.

An "issuer" may include any entity that issues any account to a user. For example, the entity may include a financial institution that issues payment accounts to users so that the user may complete a financial transaction using the payment account. In some embodiments, an issuer associated with a user of the portable electronic device may be determined by the application by the user entering an issuer identifier into the application during a registration process. For example, a user may be prompted to enter a bank identification number (BIN) into the application during registration. The application may send the issuer identifier information to an application management server during registration and a registration module on the application management server may match the issuer identifier to the particular issuer using the BIN. The registration module may then register that the application associated with the portable electronic device may be provided with issuer specific offers including special promotions as well as special benefits provided exclusively to a particular issuer. Additionally, issuers may customize the benefits they provide depending on the product associated with the account and as such, may limit the offers provided to the application based on the issuer identifier.

A "product" may include any account provided to a user. For example, a product may be provided by an issuer and may be used for payment during transactions. Furthermore, an issuer may provide a number of different products (i.e., types of accounts) for different types of customers or different levels of annual usage. For instance, an issuer may have bronze, silver, gold, and platinum products. Each product may be different based on monthly or annual spending amounts, usage frequency (how often the account is used), loyalty (e.g., length of time they have been a customer), credit rating, income of the user, or any other attribute associated with a user. Additionally, some issuers may focus particular products on certain consumer behavior such as providing a travel product that has special promotional and accountholder benefits geared for travelers or users who travel often.

As used herein, "filtering" may include any action that organizes information to highlight or prioritize some information. Additionally, filtering may include de-emphasizing or hiding some other information. For example, filtering may include providing relevance points to some offers such that those offers may be displayed to a user while other offers are not displayed. For example, offers may be filtered such that the offers are organized by relevance to a location of the portable electronic device and concierge data. Additionally, in some embodiments, filtered offers that do not reach a particular relevance measure may be deleted from the application, not stored by the application, or not sent to the portable electronic device. Accordingly, in some embodiments, a plurality of offers including promotions associated with a particular merchant as well as accountholder benefits may be filtered according to the location of the portable electronic device and concierge data associated with the user. Additionally, in some embodiments, the offers may further be filtered according to an issuer associated with the user of the portable electronic device. Accordingly, those offers that included information relevant to the location of the portable electronic device, were provided by the issuer, and were relevant to concierge data associated with the user would be displayed or provided first. Generic, global, or other offers that are not as relevant to the user, may then be after or later than the more relevant offers.

In some embodiments, each offer may be given a relevance score based on the filtering criteria and may be organized from a high score to low score. For example, an offer for a merchant located in a city that a user is in the process of traveling to may have a high relevance score while an offer that is in a different city may have a much lower relevance score. Accordingly, concierge data including a travel itinerary, reservations, or other travel related information may be used in the relevance determination. Furthermore, benefits that are not provided by an issuer associated with the user account may have a very low relevance score or may be deleted from the offer data completely. Additionally, accountholder benefits related to concierge data including a service request or response may be provided a high relevance score while benefits unrelated to the service request or response may be included last in the benefit presentation.

I. Exemplary Systems

FIG. 1 shows an exemplary block diagram of a digital concierge application system 100 according to embodiments of the present invention. As the block diagram shows, the digital concierge application 111 may use the portable electronic device 110 to communicate with a number of systems through a communications network 180. The entities may include a concierge service terminal (i.e., computer) 170, various social network server computers 160, and an application management server 141 located at a payment processing network 140. Although FIG. 1 shows the various databases including issuer data 143, offer data 144, ATM data 145, and user profile data 146 as being provided by a payment processing network 140, in some embodiments, the databases 143-146 located at the payment processing network 140 may be implemented through separate entities and the digital concierge application 111 may be configured to communicate with additional entities outside of those shown in FIG. 1. For example, in some embodiments, the application may communicate with a separate application management server 141 for registration of the application, a separate offers content management system (CMS) provided by a third party, and a separate ATM information provider system. However, in the exemplary embodiment provided in FIG. 1, the application management server 141 is located at the payment processing network 140 and the payment processing network 140 manages all of the information the digital concierge application 111 may use.

Social network server computers 160 include servers (there could be one or more) that may be operated by third parties that may provide application programming interface (API) languages to developers in order for programs to be developed to communicate with their servers. Numerous users may have accounts with the social network services associated with the social network server computers 160 and may share, organize, and otherwise communicate information to one another through the social network server computers 160.

A digital concierge application 111 may comprise any suitable software that provides front end functionality of the digital concierge application 111 to the user as described herein. For example, the digital concierge application 111 may be embodied as a software application downloadable by a computer apparatus or portable electronic device 110 (e.g., a mobile phone). The digital concierge application 111 may include a plurality of modules to provide the functionality described in the present disclosure. For example, the digital concierge application may comprise a concierge contact module 113, an offer management module 114, an ATM location module 115, an issuer data database 116, an offer data database 117, an ATM data database 118, and a concierge data database 119.

A registration module 112 may include any software or hardware module configured to register a digital concierge application 111 as being associated with a user and/or issuer account. The registration module 112 may be configured or programmed to receive registration information from a user, process the registration information by submitting the registration information to an application management server 141 (for example, using a secure API provided by the application management server 141), receiving a determination of the status of the registration, and informing the user of the status. Additionally, the registration module 112 may be programmed to receive the initial issuer data 116, concierge service contact information (which may be stored as part of the concierge data database 119), offer data 117, ATM data 118, and any other miscellaneous information necessary to activate and use the digital concierge application 111.

A concierge contact module 113 may include any software or hardware module configured or programmed to determine local concierge service contact information for the location of a portable electronic device 110 and contact the concierge service 170. The concierge contact module 113 may determine a plurality of different contact options or methods in which a concierge service representative 170 may be contacted including email, text messaging, a telephone call, live chat messaging, live video conferencing, or any other suitable manner in which a user may communicate with a concierge service terminal, server, or concierge service representative 170. The concierge contact module 113 may present any suitable contact options to the user to connect to the concierge service 170 and allow the user to select a preferred method of contacting the concierge 170.

The concierge contact module 113 may then contact the concierge without requiring the user to complete any additional steps (e.g., through a one-click or one-touch interface). Accordingly, users may contact a local concierge service representative 170 using a one-touch process of selecting a method of contacting the concierge.

An offer management module 114 may include any software or hardware module configured or programmed to manage, update, filter, and present offers to a user operating the portable electronic device 110. In some embodiments, the offer management module 114 may include two separate functions or service modules, including a promotions service module (shown in FIGS. 6-7B) and an accountholder benefits service module (shown in FIGS. 8A-8B).

The promotions service module may filter and present promotional offers associated with one or more merchants to a user while the accountholder benefits service module may filter and present accountholder benefit offers to a user. Both of these modules will be described in further detail below. However, in some embodiments, both service modules may operate similarly in that the offer management module 114 may ensure the offers are up to date, filtered according to their relevancy to the user according to location, issuer data, and/or concierge data, and allow the user to redeem or share a selected offer. The offer management module 114 may update offer data 117 and issuer data 116 stored on the portable electronic device 110, and may request updated issuer data 143 and offer data 144 from the application management server 141. The offer management module 114 may complete any further functionality related to offer presentation, filtering, redemption, and sharing as may be described herein. For example, the offer management module 114 may receive concierge data 119 from a concierge service terminal 170 and may interpret the concierge data 119 to determine if the user may be traveling to another geographic location in the future. This and other functionality will be described in further detail below. Furthermore, any of the modules shown in the digital concierge application 111 may be implemented in other server computers and the data may be passed to the portable electronic device, without requiring all of the processing to occur at the digital concierge application 111.

An ATM location module 115 may include any software or hardware module configured or programmed to provide ATM location data to a user of the portable electronic device 110. The ATM location module 115 may determine the locations of any ATMs according to a number of criteria including the proximity to a provided GPS location of the portable electronic device 110, according to a search term or keyword provided by a user, ATMs owned by a particular issuer, or through any other potential criteria. The ATM location module 115 may be configured to generate a request for information from a ATM location determination module located at a third party (e.g., the payment processing network), or may perform a search on a stored ATM data database 118 that is downloaded from an application management server 141 and located on the portable electronic device 110. The application management server 141 may periodically update the ATM data 118 stored on the portable electronic device 110 using source ATM data 145 or the application management server 141 may send location results to the portable electronic device 111 using the ATM data 145 after receiving an ATM location request from a digital concierge application 111.

FIG. 1 also shows an exemplary financial transaction system 100 including a merchant computer 120, acquirer computer 130, payment processing network 140, and issuer computer 150. The system may include one or more of each of the above entities and may also incorporate a separate application provider (not shown) that may provide the services that are currently provided by the payment processing network 140 in FIG. 1.

The system 100 may include a merchant having a merchant computer 120 that comprises an external communication interface (e.g., for communicating with an access device (not shown) and an acquirer computer 130), system memory comprising one or modules to generate and utilize electronic messages, and a data processor (for facilitating a financial transaction and the exchange of electronic messages); an acquirer having an acquirer computer 130 that comprises an external communication interface (e.g., for communicating with a merchant computer 120 and a payment processing network 140), system memory comprising one or modules to generate and utilize electronic messages, and a data processor (for facilitating a financial transaction and the exchange of electronic messages); and an issuer having an issuer computer 150 that comprises an external communication interface (e.g., for communicating with a payment processing network 140), system memory comprising one or modules to generate and utilize electronic messages, and a data processor (for facilitating a financial transaction and the exchange of electronic messages). The external communication interface of the merchant computer 120 may be coupled to an access device (such that information may be received by the access device and communicated to the merchant computer 120) or, in some embodiments, the access device may comprise a component of the merchant computer 120.

The communication network 180 may comprise any suitable network of hardware and software components configured to allow two electronic devices to communicate by sending and receiving electronic signals. Examples of communication networks include a cellular phone network, the Internet, telephone wires, etc. The communication network may be configured to receive wired or wireless communications. As would be understood by one of ordinary skill in the art, any suitable communications protocol for storing, representing, and transmitting data between components in the system may be used. Some examples of such methods may include utilizing predefined and static fields (such as in core TCP/IP protocols); "Field: Value" pairs (e.g., HTTP, FTP, SMTP, POP3, and SIP); an XML based format; and/or Tag-Length-Value format.

A concierge service terminal 170 may include any computer or other electronic device that may be associated with a concierge service or concierge service representative. In some embodiments, the concierge service may be provided by a third party (as shown) or by the payment processing network 140, issuer 150, or other entity involved in the digital concierge system 100. A concierge service terminal 170 may be used by a concierge service representative during a concierge transaction with a user. For example, the concierge service terminal 170 may include a computer that a concierge service representative is operating while completing requests from the user during a concierge service call or contact. After the concierge service representative has helped a user or consumer with their request, the concierge service representative may generate concierge data including an itinerary, service response, service request, report, or any other information related to the subject matter of the contact between the concierge service representative and the portable electronic device 110. The concierge service representative may then send the concierge data to the portable electronic device 110 through the communication network 180. The digital concierge application may store the concierge data in a concierge data database 119 or otherwise store the information so that the digital concierge application 111 may use the concierge data 119.

The payment processing network 140 may include data processing subsystems, networks, and operations used to support and deliver authorization services, exception file services, and clearing and settlement services. For example, the payment processing network may comprise a server computer, coupled to a network interface (e.g. by an external communication interface), and a database(s) of information. An exemplary payment processing network may include, for example, VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

Although many of the data processing functions and features of some embodiments may be present in the payment processing network 140 (and a server computer therein), it should be understood that such functions and features could be present in other components such as the issuer computer 150, and need not be present in the payment processing network 140, or a server computer therein.

An application management server 141 may include any server computer configured to communicate with a digital concierge application 111. The application management server 141 may be responsible for responding to offer update requests, ATM location requests, or any other data requests from a digital concierge application 111. In some embodiments, the application management server 141 may determine whether the digital concierge application software may need an update, whether the application 111 should have updated offer data 144, issuer data 143, or ATM data 145, and may manage the process of updating the digital concierge application 111 or any of the data used by the digital concierge application 111. Additionally, the application management server 141 may accept the user registration details provided during registration and store the registration details in a user profile data database 146.

The application management server 141 may include an issuer identifier module 142. The issuer identifier module 142 may be used during a registration process of a digital concierge application 111 to determine an issuer associated with a user registering the digital concierge application 111. For example, the issuer identifier module 142 may use the issuer identifier information (e.g., BIN) provided by the user during registration to map the BIN using look-up table to determine an issuer and product (e.g., account type) associated with the BIN and/or account number (e.g., PAN) associated with the user. The issuer identifier module 142 may then direct the type of information sent to the digital concierge application 111 including the issuer data 143 provided to the application. This information may be stored in the user profile data database 146 for future reference during future updates. Accordingly, a user profile data database 146 may include a digital concierge application identifier (e.g., phone number or any other information used to identify the portable electronic device 110 or digital concierge application 111 associated with a user) associated with a particular user or portable electronic device 110 and may inform the application management server 141 whether a digital concierge application 111 has been personalized with issuer information and what type of issuer data from the issuer data database 143 should be updated, sent, or otherwise provided to a particular portable electronic device 110.

The payment processing network 140 may further include one or more databases, such as an issuer data database 143, an offer data database 144, an ATM data database 145, and a user profile data database 146. Each of the databases shown in this example may comprise more than one database, and may be located in the same location or at a number of different locations.

An offer data database 144 may include generic offers that may be delivered to any of the registered digital concierge applications. Offers may include both promotional offers such as promotions, coupons, discounts, etc. as well as accountholder benefits such as accountholder insurance against loss of baggage, insurance against fraudulent charges, etc. The promotional offers and accountholder benefit offers may be stored separately or may all be stored in the offer data database 144. Additionally, the offer data database 144 may include one or more different versions of each offer so that different social networking sites with different requirements for messages can have content to post describing the offer. These sharable offers may be posted to the different social networking sites if a user chooses to share them.

In some embodiments, the offer data may include location specific information, with a sub-folder for each Mobile Network Code (MNC) for which information is stored. Each sub-folder may include a XML file, a "manifest" file, and a mobile electronic device subfolder. The XML file may describe the offers available in that region. The "manifest" file may include a name and timestamp for the last time the offer information and their associated graphics were changed. If the timestamp for a file in the manifest is not newer than the last update, then the file may be passed over or avoided by the offer management module and may not be downloaded, since the offer is already the most recent available. The mobile electronic device subfolders may include a subfolder for each mobile electronic device that the digital concierge application is designed to operate on (e.g. iPhone™, Blackberry™, Android™, etc.) which contain size-optimized graphics to be used for displaying the various offers on each type of device.

An ATM data database 145 may include information identifying locations where issuers may have ATMs. The ATM data database 145 may be organized in any suitable manner including by issuer or geographic location. Additionally, the application management server 141 may send all or particular portions of the ATM data to a portable electronic device 110 after registration of a digital concierge application and may provide updates of the ATM data. The ATM data 145 may be updated whenever requested or periodically.

The issuer data database 143 may include any issuer-specific information. For example, some issuers may have specific concierge services, issuer specific offers including both promotions and accountholder benefits, issuer specific ATM information, or any other specific issuer information that may be used by the digital concierge application.

The user profile data database 146 may include any information associated with the user. For example, the user profile data database 146 may comprise the portable electronic device identifier, account and issuer identifiers, history of transactions, or any other relevant information that may be used in a transaction.

An issuer may typically refer to a business entity (e.g., a bank or other financial institution) that maintains financial accounts for the user and often issues a payment device such as a credit or debit card to the user. A "merchant" may typically refer to an entity that engages in transactions and can sell goods or services to the user. An "acquirer" may typically refer to a business entity (e.g., a commercial bank or financial institution) that has a business relationship with a particular merchant or similar entity. Some entities can perform both issuer and acquirer functions.

A "server computer" is typically a powerful computer or cluster of computers. For example, the server computer can be a large mainframe, a minicomputer cluster, or a group of servers functioning as a unit. In one example, the server computer may be a database server coupled to a Web server.

II. Exemplary Methods

Exemplary methods implementing some of the functionality described herein according to exemplary embodiments of the present invention are described below with reference to the system diagram of FIG. 1. The methods described below are exemplary in nature, and are not intended to be limiting. Methods in accordance with some embodiments described herein may include (or omit) some or all of the steps described below, and may include steps in a different order than described herein.

A. Registration Process

Figure 2:
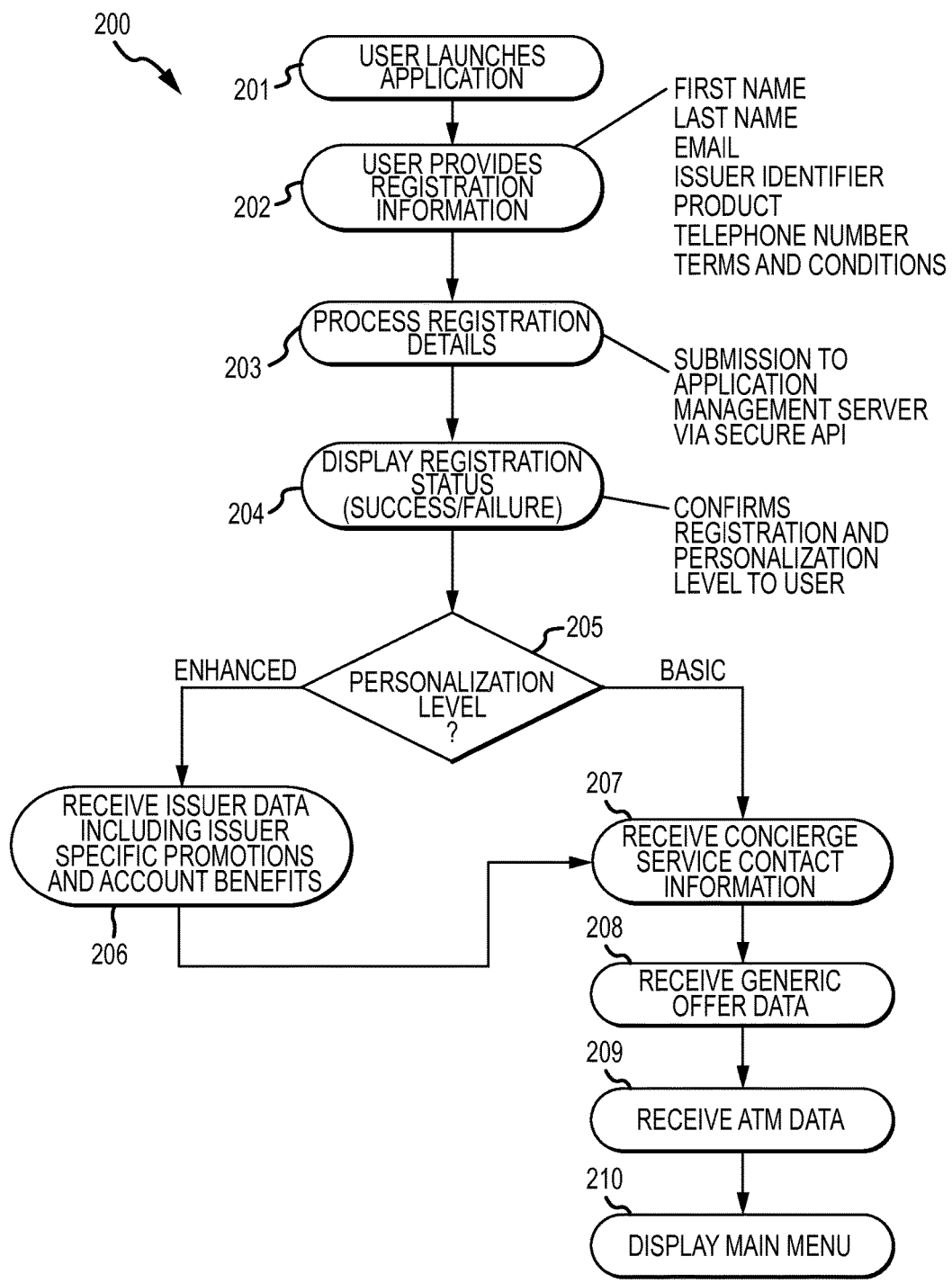
FIG. 2 shows a process flow chart of the registration process for a user according to one embodiment of the invention.

FIG. 2 shows a process flow chart of the registration process 200 for a user according to one embodiment of the invention. The registration process 200 may be a prerequisite for using the application with all users performing one of two levels of registration: basic or enhanced. During basic registration, users may provide their name, email address, and basic product details. The basic registration process enables users to access generic functionality including generic offers provided to all users and ATM location functionality. Users that register through the basic method may be referred to as basic users. Furthermore, many of the basic registration fields may be automatically populated as allowed by the operating system (OS) of the portable electronic device if the OS of the portable electronic device stores personal information (e.g., a user's name, email address, contact information, etc.) about the user.

Alternatively, enhanced registration may include the user providing additional information as well as the basic information supplied in the basic registration. Specifically, in the enhanced registration process, users may provide an account issuer identifier (e.g., a bank identification number (BIN)) for the issuer associated with their account. Providing the issuer identifier may enable a greater degree of service personalization and access to the concierge service because some issuers may have predetermined relationships with particular concierge services or may provide additional issuer specific offers including both promotions and accountholder benefits. These users may be referred to as enhanced users. The issuer identifier may be stored and communicated with the application management server instead of the full personal account number (PAN) of the credit card or account for security purposes. Additionally, the user's PAN may not be used in all embodiments because in some embodiments of the present invention, the offers may be personalized by issuer, not by user account.

Registering a user with the digital concierge application can be performed when the application has a data connection with a communication network or otherwise may communicate with an application management server. The user-registration data may be entered by the user into the digital concierge application and may be passed to a registration module located at an application management server. The registration process may be completed using any suitable protocol including a simple and secure HTTPS Application Programming Interface (API) with the application management server including the registration module which may have the proper certificates installed. The URL and API for the registration module may be embedded into the application. The registration module may indicate, through the API, whether or not the registration request was successful to the digital concierge application.

In step 201, upon launching the application for the first time, the initial registration screen may be displayed to the user. The initial registration screen prompts the user to enter registration details including personal identification details for basic registration.

In step 202, the user may provide their registration details. The registration details may include first name, last name, email address, telephone number, and product type (which may be presented in a drop down list). Additionally, the user may be prompted to agree to the terms and conditions of the service.

During the initial registration, the user may also register using the enhanced registration options. An optional issuer identifier field may be provided for the user to submit their financial institution card information enabling full issuer personalized registration to occur. For example, the card number field may be obscured on entry and only the BIN range may be stored. Furthermore, the application may contain logic to prompt for the correct BIN range depending on the country version of the application downloaded or the location of the portable electronic device at the time of registration. For example, Mexico and Brazil may prompt for the first 9 digits but other country versions could prompt for different BIN ranges (e.g., first 6 digits). Additionally, the application may contain a lookup table that associates BIN ranges with particular issuers or products.

In step 203, on submission of the initial registration screen, the registration details provided by the user are validated by the registration module of the digital concierge application (e.g., the application may ensure mandatory fields and valid BIN ranges are entered) before the registration details are sent securely to an application management server including a registration application programming interface (API) so that registrations can be tracked by the service provider (e.g., payment processing network in FIG. 1). The application management server may store some or all of the registration details in a user profile data database. The user profile data database may store which issuer identifier is associated with the user's digital concierge application, portable electronic device, or user account information. In some embodiments, the user profile data could also store payment information, a history of offers redeemed or selected by the user, or any other information that may be useful in operating or enhancing the digital concierge application.

In step 204, the application may receive a registration status update from the application management server informing the application whether the registration was successful. After registration is complete, a status screen may be displayed to the user showing success or failure in addition to the level of issuer personalization the user has signed up for (basic or enhanced registration).

In step 205, the registration module may determine whether the user registered as a basic or enhanced user (i.e., provided an issuer identifier during registration) and may download or receive different information depending on the personalization level of the registered application. The registration module may determine the personalization level by communicating with the application management server, determining whether issuer data has been stored on the portable electronic device previously, by investigating a flag or data stored on the portable electronic device that indicates the status of the registration (e.g., basic or enhanced), or through any other suitable manner.

In step 206, if the user has provided the issuer identifier and completed an enhanced registration, the application may receive issuer data including special or issuer specific promotions and accountholder benefits associated with the issuer identified during the enhanced registration.

In step 207, no matter the registration method (basic or enhanced) or level of personalization, the application may receive concierge services contact information. The concierge services contact information may be provided in any suitable manner including a look-up table based on user location, issuer identifier, or any other suitable criteria. For example, a concierge service may have different contact information for travelers located in the United States than those located in Mexico or another South American country. Additionally, the concierge service contact information may comprise different contact options for each geographic location. For example, the concierge service contact information may include an email address for a concierge service, a URL to contact a live chat features with a concierge service representative, a contact number for text messaging or short message service (SMS) messages, or any other suitable contact information that the concierge contact module may use to contact a concierge service representative. The concierge contact data may be saved on the portable electronic device. In alternative embodiments, the concierge contact module may send a request to a central concierge service contact each time the user requests to contact a concierge and may receive the appropriate contact information in return.

In step 208, no matter the registration method (basic or enhanced), the application may receive generic offer data from the application management server. As explained previously, offer data may include both promotions and accountholder benefits associated with an account. Generic offers may include general, nation-wide, or world-wide offers that may be used by any issuer associated with the application provider. Furthermore, the generic offers may include local or global offers. For instance, the offers may include offers from a large number of countries, may be limited by geography, or all offers registered with an application provider may be provided to the digital concierge application. If only a limited set of offers are provided to the application based on location, region, etc., the offers may be automatically updated at any suitable time. For example, if the offer management module determines that the user may be traveling to an area where the offer management module does not have offers loaded, the offer management module may request updated offers for that region from an application management server or otherwise may be provided with the updated offers.

In step 209, no matter the registration method (basic or enhanced), the application may receive ATM data. The ATM data may include ATM location data and may be provided in any suitable format. For example, map data may be provided such that the application provides its own free standing map program with embedded ATM location data or the ATM location information may merely embed ATM locations into separate mapping programs already present on the portable electronic device. Furthermore, in some embodiments, the ATM data may be provided during each request for an ATM location and no ATM data may be stored on the portable electronic device.

Figure 4:
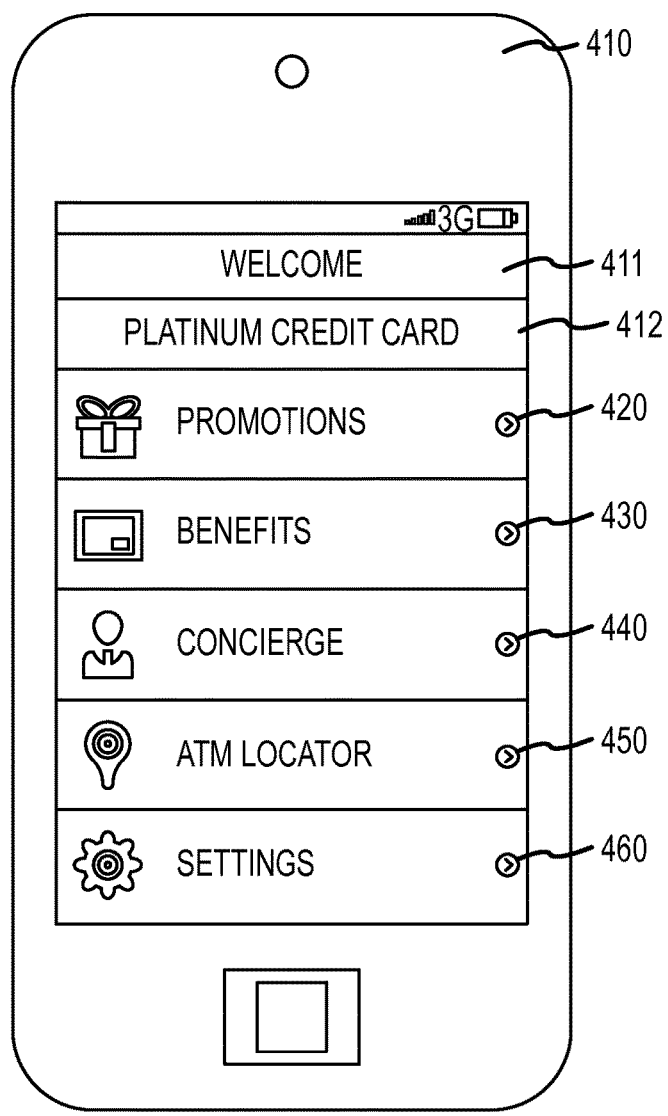
FIG. 4 shows an exemplary embodiment of a graphical user interface associated with a main menu of a digital concierge application on a portable electronic device, according to one embodiment of the present invention.

In step 210, once the various digital concierge application data is downloaded, the application may display a main menu comprising the functional modules available for consumer interaction. The main menu may be interactive such that the user may initiate any of the functionality described herein by touching a screen, speaking into a microphone, or otherwise interacting with the portable electronic device. FIG. 4 illustrates an exemplary screenshot of the modules displayed to the user in an exemplary graphical user interface.

As shown in FIG. 4, the main menu may include a promotions service module 420, a benefit service module 430, a concierge service module 440, an ATM locator module 450, and a settings module 460. The main menu may further provide a display title 411 and inform the user of the product that is registered 412. For example, in FIG. 4, the digital concierge application has been registered with a platinum credit card, accordingly the user is an enhanced user and is registered as being associated with a particular issuer. In some embodiments, issuer information may be displayed in this area as well as the product information. Each of these displayed modules is interactive and the user may select any of the modules to launch functionality related to each module. These modules may be described in further detail below.

B. Concierge Service Module

A concierge service module may provide local concierge contact information so that a user may contact a concierge service representative, no matter where they are located in the world. Using embodiments of the present invention, the concierge contact module may provide general information, reservations, directions, call completion, meeting organization, and courier services as well as other customer oriented services and functionality. Additionally, the concierge service may allow users to submit claims for accountholder benefits, sign up for new accountholder benefits, or perform any other customer service oriented services for the user. The user may interact with a concierge service representative through e-mail, a phone call, chatting, or text messaging services. The concierge service representative may be a real person for some tasks (e.g., completing a call, organizing a meeting, etc.) or a computer program for other tasks (e.g. making a reservation, providing directions, submitting a service claim, etc.). FIGS. 5A-5B show exemplary embodiments of a graphical user interface associated with the concierge module on a portable electronic device according to one embodiment of the invention.

As shown in FIG. 5A, when a user accesses the concierge section of the application the user may be presented with multiple contact options 441-444. For example, "Email Us" 442 or "Call Us," 441 may be used to contact the concierge service representative through email or phone call respectively. These buttons provide a "one-click" solution such that the user does not have to type in a phone number or email address. The user merely presses the button 441,442 and the phone call may be made or the email may be pre-filled with the appropriate contact information. It is also possible to implement a "Text Us" 443 or "Chat With Us" 444 options that provide a texting or chatting contact option to access a concierge service. The chatting or texting functionality may work similarly to the described call and email systems but may connect directly to a human or computer system that could answer questions through sending and receiving texts from the user.

FIG. 5B shows an exemplary graphical user interface when the user selects the "Click to Call" option. The user may be presented with one of two possible numbers to call as on-screen buttons 445: a general number or a personalized number. The general number may be a world-wide number or the number of the country where the application was originally downloaded. The personalized number may be based on the location of the portable electronic device and may be determined by accessing the GPS location information of the portable electronic device or through any other suitable method as described herein. The personalized number may also be based on the language settings of the application such that the concierge speaks the user's language even if the user is traveling in a foreign country.

Providing a personalized number provides the benefit of connecting the user with a concierge that is familiar with the businesses and services provided in the area. This may result in a faster and more rewarding concierge experience for the user. Furthermore, connecting with a concierge that is localized may ensure that the best possible deals are provided to the user as the concierge may be more familiar with deals that are located in the area they usually provide services for. Additionally, using a local concierge may strengthen the business relationships between the concierge service provider and the local businesses in the area as they become familiar with the concierge service that usually contacts them.

The concierge contact numbers may be determined through any suitable method. For example, the concierge contact module may use a concierge service contact look-up table to map a Mobile Network Codes (MNCs) being used by the portable electronic device to one or more local numbers that connect to the concierge service. A default concierge number may also be included which should be used when the MNC is not one of those explicitly included in the look-up table. Additionally, a location of a portable electronic device may be determined through use of a GPS receiver, triangulation of communication network signals, or any other suitable method. The location may then be mapped to the concierge service contact look-up table and localized concierge contact information may be determined.

Thereafter, the user may select one of the contact options which may initiate a manner of contacting the concierge (e.g., a phone call in this case). The phone call may be initiated with the selected number using the portable electronic device's (e.g., phone's) standard voice-call interface. The portable electronic device may connect the user to a live concierge service representative who can help the user with whatever service they are requesting.

Alternatively, if the user selects the "click to email" option instead of the click to call option, the user may be presented with a screen that enables the user to select a subject for their email from a dropdown list and a free text section for the body text. A dropdown option of "Other" may be available which enables users to enter a free text subject relating to their query if selected. The email form may be pre-filled with information obtained during registration including name, email address, product type, language preference, and telephone number. The email may also be preformatted with a standard request for information or a request for a call from the concierge without requiring the user to input any information. The concierge email addresses may be determined using a similar process to that described above in regards to the telephone number. The email address may be a single address for all users if there is a single entry-point for all concierge email requests, or a local concierge email address could be provided through an email-address to MNC mapping.

Once a user submits an email subject, the user may then be prompted to confirm their contact details for the response.

Two options may be displayed: email and phone. If email is selected the first name, last name, email address, language and product type provided at registration are shown to the user. A button may be provided for them to update their registration details if necessary which may overwrite the registration settings stored details on the phone. If phone is selected the mobile number is shown. Once a contact option is selected, an email may be sent to the concierge service with the details included. An email status screen may be shown to the user as a success or failure.

C. Promotions Service Module

Figure 3:
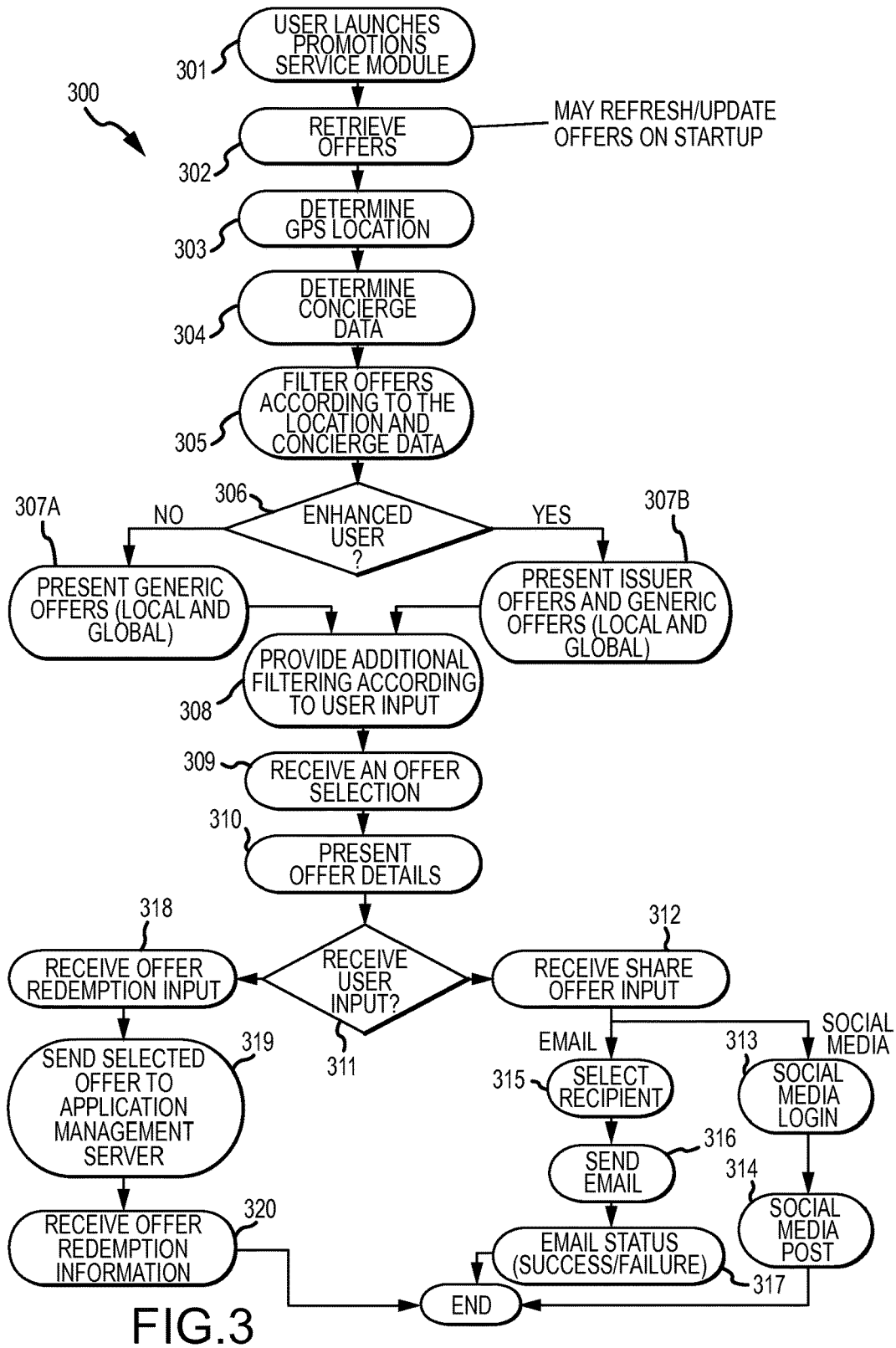
FIG. 3 shows a process flow chart of an exemplary method of providing relevant promotional offers by a promotions service module according to one embodiment of the invention.

FIG. 3 shows a process flow chart of the promotions module 300 according to one embodiment of the invention. The digital concierge application's promotions functionality may enable users to browse either generic or targeted promotions (specific to their country, geographic location, or issuer) based on their registration preference (registration details provided by the user during registration). The promotions service module may be a portion of the offer management module shown in FIG. 1.

The promotions service module may present three types of promotions to the user: global promotional offers, local promotional offers, and issuer-specific promotional offers. Global promotional offers may include generic promotional offers that may be provided to all users of a particular product (i.e., type of account the user has with the issuer). The global promotional offers may or may not be for global merchants, companies, or service providers that are not location dependent. Local promotional offers may include promotional offers that are only offered in certain geographic locations. The local promotional offers may be for small businesses or businesses that are only offered in a particular country or region. Issuer or BIN specific promotional offers may include promotional offers that a specific issuer or financial entity provides only for those users who have an account with the issuer. These promotional offers may also be local or global. These offers may be provided through issuer data downloaded separately from the application management server or may be included in the offer data provided by the application management server. Local or issuer specific offers may be displayed first and provided higher relevance scores. However, the user may be provided the ability to further filter the promotional offers using an interactive feature to further filter the options by the country, category, sub-category, or region. Additionally, further filtering may be available based on any suitable offer criteria (e.g., merchant, expiration date, issue or generation date, etc.).

Figure 6:
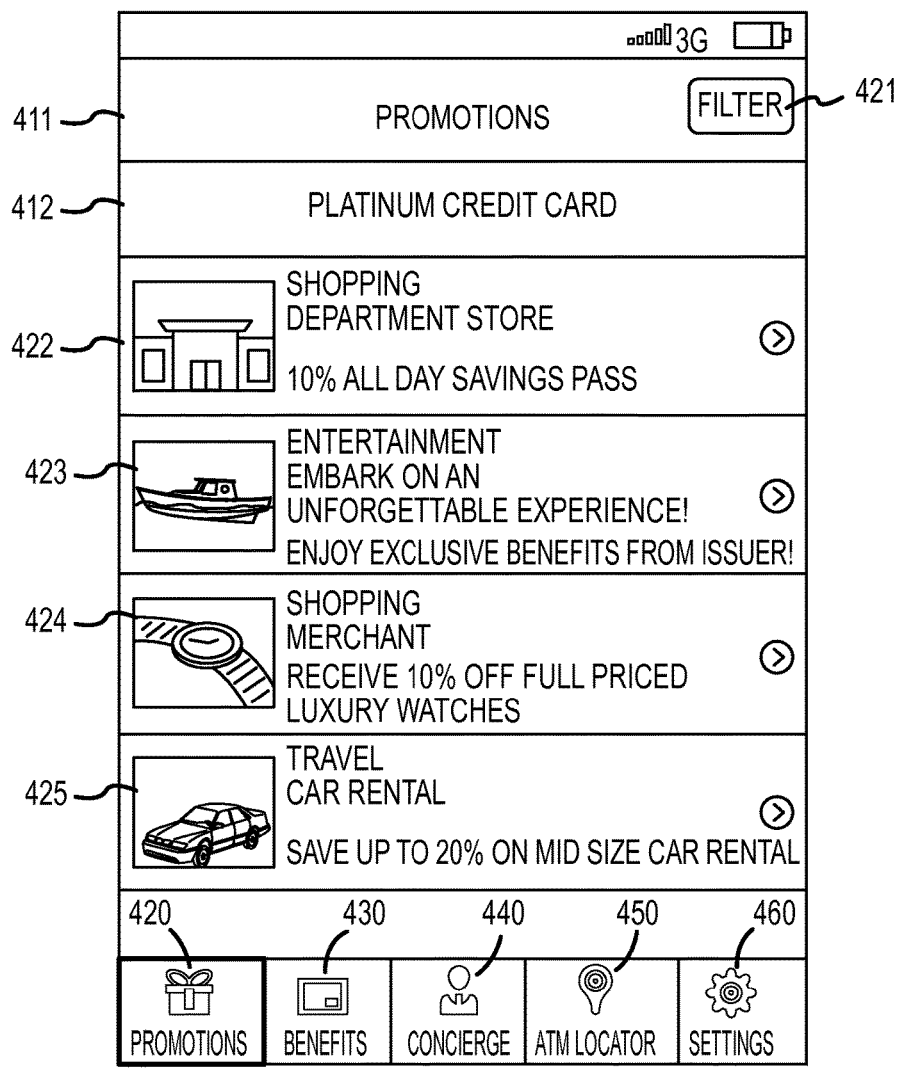
FIG. 6 shows an exemplary embodiment of a graphical user interface associated with a plurality of offers provided by a promotions service module on a portable electronic device according to one embodiment of the invention.
Figures 7A, 7B:
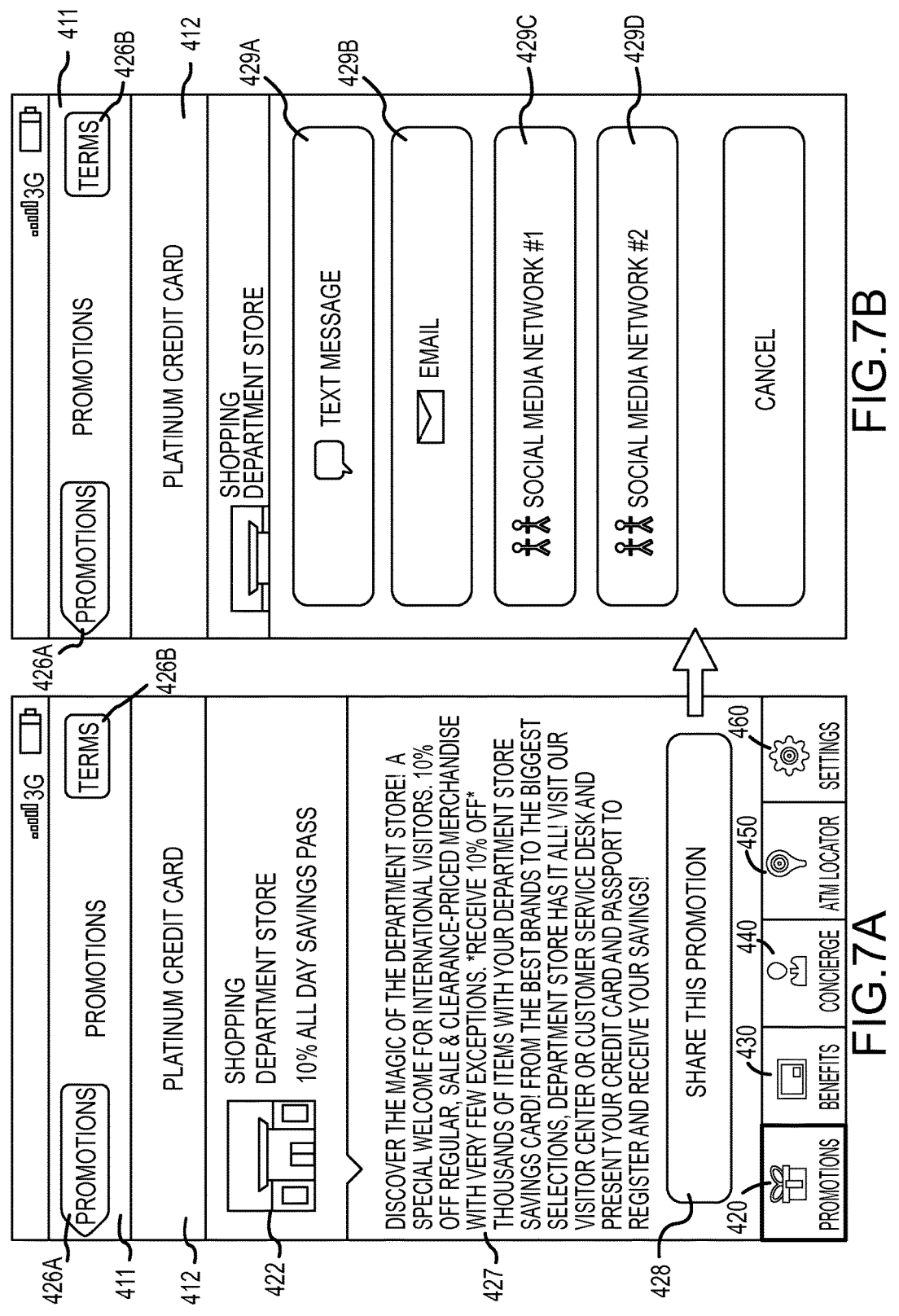

As shown in FIG. 6, the promotional offers may include an "inbox" that provides general or basic promotional offer information along with merchant branding or an icon indicating the type of service or product that is the subject of the promotional offer 422. Additionally, the offer details including the terms and conditions 426B as well as qualifications information 427 may be displayed separate from the general offer information 422-425 and may allow a user to investigate this information if they so wish. The offers may also be redeemed, shared, saved for later use, or otherwise interacted with using a "one-click" solution. FIGS. 6 and 7A-7B illustrate example screenshots of the promotions module displaying promotional offers to the user. FIG. 6 shows an exemplary promotional offer inbox while FIGS. 7A and 7B show promotional offer details 427 and share options 429A-429D for a selected offer 422.

Returning to FIG. 3, a method of providing filtered offers to a user is shown, according to an exemplary embodiment of the present invention. In step 301, the method begins when the user launches the promotions service module from the main menu (as shown in FIG. 4).

In step 302, a list of local and global offers may be retrieved from an offer data file or database. In some embodiments, the offer data may be updated or refreshed and updated offers may be received from an application management server using an XML data feed or other suitable method. The offer data may contain offer information and offer attribute data (e.g., an associated region, country, category, merchant, associated issuer, expiration date, etc., to the offer) to allow personalization details to be applied and filtering to occur. Basic users may be provided with only generic promotional offers and enhanced user may be provided with both generic promotional offers and issuer-specific offers. Accordingly, enhanced users may be shown a personalized list of offers including targeted promotional offers for the specific card or product corresponding to their registered profile. The offer data can be refreshed manually through the use of a refresh button, triggering a new offer update request to the application management server.

In step 303, the application may determine location of the portable electronic device. In the example shown in FIG. 3, the offer management module may use the mobile electronic device's GPS functionality (e.g., GPS receiver or chip) to determine where the portable electronic device is currently located. The application may use the portable electronic device's GPS functionality to filter offers by location, displaying local offers first in a list by providing a higher relevance score for local offers based on proximity to the city, region, or country where the user is currently located.

In step 304, the application may determine concierge data associated with the user. For example, the offer management module may determine whether the user may be traveling to another country, region, state, city, etc. in the near future from concierge data provided by a concierge service representative. For example, as explained previously, the offer management module may determine whether the user is traveling to another region by receiving and interpreting concierge data including a travel itinerary, a calendar, coded messages provided by a concierge service representative, or any other suitable method.

In step 305, the offers may automatically be filtered according to the determined location and concierge data. The offers may be filtered using any suitable method. For example, in some embodiments, a relevance score may be provided for each received offer and the offers may then be filtered and ordered according to their relevance score. In some embodiments, if an offer does not meet a particular relevance score threshold, the offer may be deleted from the offer data or otherwise not shown to the user.

In some embodiments, relevance scores may be allocated and determined through a number of methods including providing higher scores for offers in a local area (neighborhood, city, state, etc.), then providing offers that may be present for an area that the concierge data indicates the user may be traveling to in the future. The closer the travel date to the present date, the more relevance points may be provided to the promotional offer. Accordingly, as the travel date approaches, a user may find the offers more relevant to their experience and on the date of the travel, the user may be provided with offers corresponding to where they are traveling instead of merely promotional offers for where they are leaving from or currently located. Accordingly, the user is provided with a method of receiving more relevant offers and information for their upcoming travel. Next, issuer specific offers may be provided with a higher relevance score than general or global promotional offers (for enhanced users). Furthermore, the relevance points may be distributed according to a hierarchy of country specific offers, then regional or continent-specific offers, and finally world-wide or global offers that are negotiated by a payment processing service provider.

Accordingly, in some embodiments, offers that are local and issuer-specific to the user's current or future location may be provided more relevance points than offers that are global and non-issuer specific. However, any other methods for allocating promotional offer relevance points may be implemented and any other method of ranking, filtering, or determining which offers to present to a user may be implemented.

In step 306, the promotional services module determines if the user is registered as an enhanced user. The promotional services module may make this determination by determining if issuer data is present on the portable electronic device, determining if a flag, setting, or data type has been triggered to inform the module that issuer data should be received or determined, by requesting the personalization level from the application management server 141 which may determine the status of the user registration using the user profile data 146, or through any other suitable method.

In steps 307A and 307B, the filtered promotional offers may be presented to the user. The filtered offers may be displayed through any suitable means including a list, a diagram, or any other organizational method. For example, in one embodiment, the offers may be displayed on a list from most relevant at the top of the list to the least relevant at the bottom of the list. As a user browses through the offers, the lower relevance offers may be displayed until the last filtered offer is presented.

If the user is a basic user, then the offer management module may present generic promotional offers including both local and global promotion offers. If the user is an enhanced user than the offer management module may present both issuer promotional offers and generic promotional offers. For example, as shown in the exemplary graphical user interface of FIG. 6, a user may be presented with a list of promotional offers 422-425 including a promotional offer related to shopping at a department store in the city where the portable electronic device is located or where the user may be traveling to soon 422, a boat tour provided exclusively for users associated with issuer 423, and other promotional offers 424-425. Accordingly, the list of offers may be filtered according to the issuer offers and proximity of the promotional offers to the user's location.

In step 308, the application may also offer the user the ability to further customize the filtering of promotional offers by region, country, category, or subcategory to make browsing easier through a user filter input 421. This manual filtering or user filtering input may cause the offer management module to re-allocate relevance scores or may merely use keyword searching in the promotional offer criteria, description, or other data for offers that meet a particular criteria. Additionally, the manual filtering may reset the relevance scores so that the normal filtering does not apply when the manual user input filtering is applied. Accordingly, the user may interact and influence the filtering of the promotional offers in the application to allow the user to find a particular promotional offer that they may be searching for. For example, as shown in the exemplary graphical user interface of FIG. 6, a user may be provided with a filter option 421 that may allow the user to select further filtering options.

In step 309, the application may receive a selection of a promotional offer by the user. The user may navigate through the presented promotional offers and may interact with one of the icons or brief descriptions to obtain additional information regarding the promotional offer. In some embodiments, the offers may ask for an update from the offer management module when the user attempts to access the offer. Accordingly, the offer management module may try to update or refresh the offer by communicating with the application management server. Alternatively, if live updating is disabled, the location based offers may be updated when the user triggers a manual update. In the case of a live-update, the user may be shown the existing data whilst the update is taking place, and then be shown the updated data when the download/update check is completed. Settings may allow a user to toggle the automatic fetching of offers.

In step 310, upon selecting a particular promotional offer, the promotional offer details may be displayed or presented to the user, including any terms and conditions. For example, as shown in the exemplary graphical user interface of FIG. 7A, a user may select a promotional offer 422 for shopping at a department store that provide 10% off purchases made at the department store for a particular day and may obtain additional details 427 regarding the promotional offer. For instance, a user may be provided with a marketing message 427 and an option to share 428 or redeem (not shown) the promotional offer 422.

In step 311, the application receives an input by the user. A number of different options may be displayed to the user in the detail section, depending on the type of promotional offer and the possible redemption steps. For example, if the promotional offer requires a purchase or other further action by the user, the user may be shown a redemption button. If the user presses the redemption button, the offer management module may begin a redemption process and interact with the payment processing network, issuer, or a merchant to complete the redemption request. Alternatively, the user may be provided with sharing options 429A-429D (as shown in FIG. 7B). Accordingly, the application may receive an input to share the offer.

In step 312, the user may enter the option to share the promotional offer and the application may receive the selected share option. Embodiments of the present invention may provide a number of options for sharing offers including email 429B, text message 429A, via social media networks 429C-429D (e.g., Facebook™, Twitter™, or Orkut™), or any other suitable methods of communicating with colleagues or friends. For example, as shown in the exemplary graphical user interface of FIG. 7B, a number of different sharing options 429A-429D may be displayed to the user.

In step 313, a user may be prompted to grant permission to post to their selected network on their behalf. This may involve the user authenticating with the network via the standard login process (e.g., OpenAuth™) which may be displayed as a layer on top of the application or through any other suitable method. Once logged in, the user may then be able to use the application share buttons to post to their personal newsfeed (e.g. Facebook Wall™ or Twitter Timeline™) (step 314). The application may use the standard social media APIs to achieve the sharing (e.g. OpenGraph™ API, Twitter™ API) or any other suitable method to achieve the sharing of information.

Third party open-source libraries may be used for both the authentication and social-network linking uses. Each social network server computer may also be addressed using its relevant authentication method which may be different for each social network. In the event of a change in the API for a social network, the digital concierge application may require updating, which may be initiated by the application management server, the digital concierge application, or any other suitable entity.

If the option to share by email is selected, users may be presented with their contact address book which may be filtered for users with email addresses. On selecting a contact (step 315), a pre-configured email may be sent with details of the offer (step 316) and a success message may be displayed to the user (step 317). If the recipient is not in the users address book, users may also be able to enter a free-text email address. A similar process may be implemented for texting a contact or for any other future communication sharing methods for contacting users from a portable electronic device.

As shown in step 318, if a user decides to redeem or purchase a promotional offer, the digital concierge application may receive an offer redemption input. The offer management module may then collect payment information from the user, may confirm the user wants to purchase or redeem the promotional offer, and otherwise may prepare a message informing the payment processing network, issuer, or merchant of the request to redeem or purchase the offer. Additionally, a mobile wallet that is installed on the portable electronic device or on a server somewhere may be used to obtain purchase or account information.

In step 319, the offer management module may send a selected offer to the application management server with an indication that the user would like to redeem or purchase the selected offer. The offer management module may then leverage its position at the payment processing network (in the exemplary system shown in FIG. 1) to complete a transaction according to the terms of the selected offer. Accordingly, the offer may be redeemed through any suitable method. For example, a redemption request message may be generated that includes an indication of the account associated with the user and payment information for generating an authorization request message that may be sent to an issuer to authorize a transaction according to the terms of the selected offer. If the payment information is authorized, the payment processing network may receive an authorization response message from the issuer and may forward the authorization response message to a merchant associated with the offer. Additionally, in some embodiments, the digital concierge may be incorporated into or coupled with a mobile wallet or mobile payment application. Accordingly, the digital concierge application may have access to the user's payment information and may collaborate with the mobile wallet or mobile payment application to complete a transaction.

In step 320, after sending the payment information, the offer management module may receive offer redemption information associated with the selected offer that informs the user how they may go about redeeming or collecting the subject matter of the offer. The offer redemption information may comprise any suitable information. For example, the offer redemption information may include a confirmation number to be presented to a merchant in exchange for a purchased item, may comprise a confirmation message that a transaction has been completed, or may include any other suitable information. Accordingly, in some embodiments, the user may be capable of redeeming or completing a purchase using a selected offer presented by the digital concierge application.

Although, many of the modules described above are located at the portable electronic device, in other embodiments of the present invention, all of the modules located on the portable electronic device could be present in the application management server computer or elsewhere. Accordingly, the portable electronic device may act as a client and the payment processing network server computer may complete all or some of the processing steps shown in FIG. 3. This could be true of any of the embodiments and functionality described herein, for any of the modules.

D. Accountholder Benefits Service Module

An accountholder or cardholder benefits module may enable a user to quickly view the benefits associated with using their registered account or card. Accountholder benefits may include services that may be included in the service agreement between the accountholder and the account issuer, bank, or payment processing service that provides the account service or they may be optional benefits offered to cardholders. For example, cardholder benefits could include insurance, fraud protection, reward systems for purchases, etc. The benefits offers returned may either by generic or personalized based on the registration setting and there may be an option to easily contact a customer service representative to activate optional benefits that are explained. The customer service representative contact options may be geo-located to provide local phone numbers as explained above regarding the concierge contact module. Additionally, the concierge service may provide the customer service as well. The benefit offers may be "cached" or saved on the portable electronic device such that they may be accessed even when the portable electronic device does not have access to a data or cellular network. FIGS. 8A-8B illustrate an exemplary graphical user interface for an accountholder benefits service module presenting a plurality of benefit offers.

The accountholder benefits service module may implement a similar method as that explained above regarding the promotional offers service module. The user may access the cardholder benefits module which may initiate a request for updates to the application management server or may receive information from an offer data database located on the portable electronic device.

The list of available cardholder benefits may be filtered similarly to the promotional offers explained above in reference to FIG. 3. For example, relevance scores may be assigned to each accountholder benefits offer where the points are provided based on location and concierge data. However, because benefits offers may not be as dependent on location of the user at any given time, fewer relevance points may be provided for the location of the portable electronic device. However, benefit offers that are limited by geographic location including country, region, continent, etc. may still be filtered according to relevance points provided based on location of the portable electronic device. Additionally, relevance points may be provided based on the users registration settings with generic benefits retrieved for basic users based on the product selected at registration, and targeted benefits retrieved for enhanced users, and targeted benefits provided more relevance points. Additionally, targeted benefit offers may be based on the issuer identifier (e.g., BIN number) of the registered digital concierge application.

As shown in FIGS. 8A-8B, an initial screen showing benefit categories 431-434 may be shown enabling the user to click through to a list of associated benefits. The benefits list 431-434 may display text and images relating to the offer. The offer could be savings when using the card at a particular merchant, travel insurance when purchasing travel related products, or any other type of cardholder benefit provided by financial institutions to incentive spending or distinguish their card from other cards. For example, a financial institution may decide to target consumers who fly often so they may offer an airline miles card where users may be given airline mile points as a benefit for purchases they make. Furthermore, the card may provide travel insurance on any purchases made with the card related to travel. The airline miles card may have rules related to how the points and the travel insurance offers are provided, including how long the points are available to be used, which purchases are eligible for travel insurance, and other terms of the benefits. The benefits list may retrieve and display the program name, such as "travel insurance" if the card is associated with an issuer identifier that correlates to the type of product or account that provides those offers. These issuer-specific offers may be included in issuer data provided by the application management server or through the general offer data.

As shown in FIG. 8B, an offer can be selected 432 and offer details may be displayed 435. The details 435 may provide information related to the terms and conditions, geographical eligibility information, any limits on the offers, etc. For example, the user could select the "baggage delay insurance" offer as shown in FIG. 8B. The user may be shown the details of the offers as described above and may have an option to contact 436 a concierge service representative or customer service representative responsible for fielding questions by users, accepting claims under the system, or performing any other services related to the accountholder benefits. There may be a "Click to Call" option 436 on each offer as a call to action for the cardholder to take advantage of the offers they are provided by their card. This click-to-call option 436 may function as described in earlier sections regarding the concierge module. As described above in reference to FIG. 3, any suitable contact options may be provided including chat, email, text message, or any other suitable method of contact.

E. ATM Locator Service Module

Figure 9A:
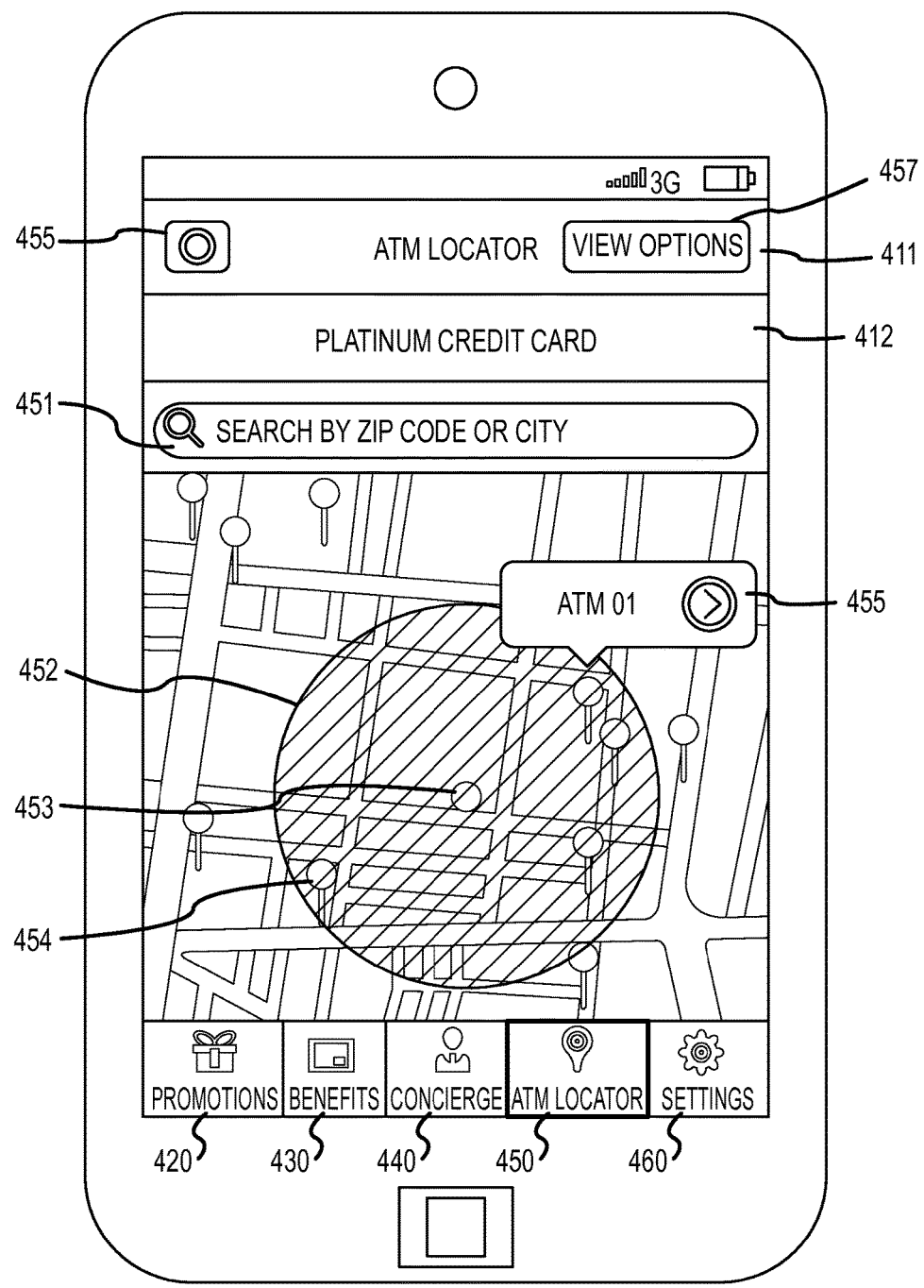
FIGS. 9A-9B show exemplary embodiments of a graphical user interface associated with an ATM locator module on a portable electronic device according to one embodiment of the invention.
Figure 9B:
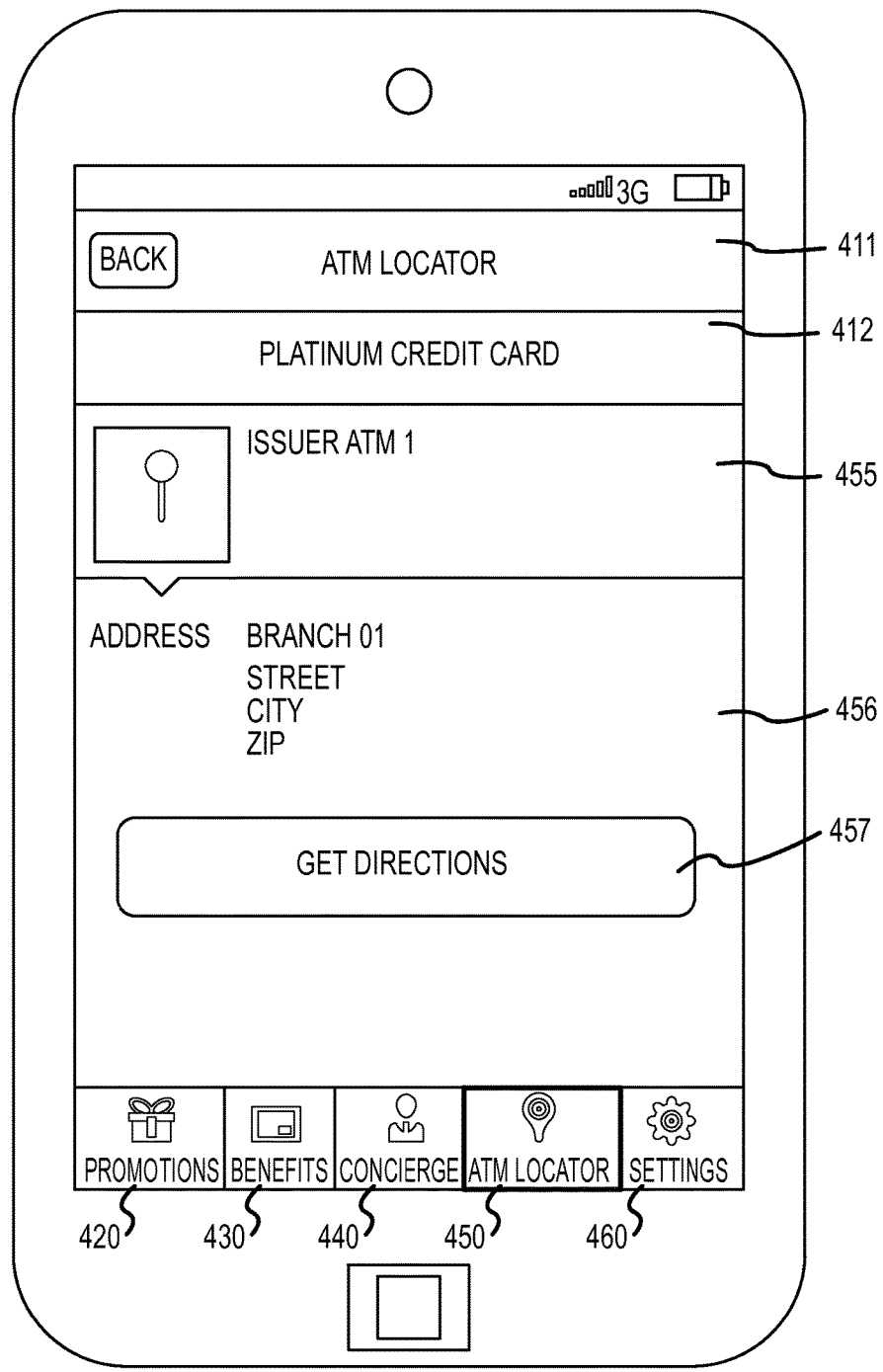

FIGS. 9A-9B show exemplary embodiments of a graphical user interface associated with the ATM locator module on a portable electronic device according to one embodiment of the invention. The ATM locator module may be configured to allow users to find any ATM around their current position, based on the portable electronic device location. Additionally, a user can search for an ATM using a landmark, address, or type of ATM as well.

As shown in FIG. 9A, in some embodiments, a user may initiate the ATM location service module and the ATM location module may retrieve the portable electronic device's current position 453 and the current location may be set to the default search location for ATMs 454 in the surrounding area. A screen may be presented to the user where the default search parameters may be amended by the user in search input area 451. Additionally, in some embodiments, the default search parameters may include the option to modify the location by entering a zip code 451. Furthermore, for enhanced users, an option may allow the user to decide whether to display account issuer specific ATMs only and this data may be pulled from the issuer data provided during registration. Alternatively, a request may be sent to the application management server computer for location data included in the ATM data or issuer data.

Furthermore, upon the search details being submitted, the ATM location may be determined by the ATM location module using the ATM data to determine the ATM locations. Alternatively, a request may be generated by the ATM location module and may be passed to an ATM search service at the application management server (or elsewhere) which returns a list of a predetermined size (e.g., up to 30) of the closest matching ATM locations to the ATM location module. These locations may be shown as dots 454 on the screen.

The list of ATM results may include an ATM's location, distance from the portable electronic device (via geo-location details), and address details. Additional search results can be loaded once the user has scrolled to the bottom of the results list. This information may be taken from a live-system or alternatively, the ATM data may be updated periodically based on current location and cached in an ATM data database in case the device goes into an offline state or loses connection to the communication network.

Furthermore, the application may also provide the ability for the user to toggle the search results list view using a view options button 457 to display a map showing up to the predetermined number of ATM locations overlaid on a small-scale map (as shown in FIG. 9A). Map sizing may be scaled to the number of ATM locations in proximity to the handset's current location. A large number of locations (e.g.—in city centers) may cause a small-scale map to be created (e.g.—<1 mile). A small number of locations (e.g.—in rural areas) may cause a large-scale map to be created (e.g.—25-mile map). A lower number of mapped search results may generate a large scale map. ATM icons on the map can also be selected to view the ATM detail screen 454. The map display may provide buttons so that the map views can be toggled between Map, Satellite, and Hybrid views 457. Map view (shown in FIG. 9A) may include a representation of the mapped area while only showing the street names and other input items on the map. Satellite view (not shown) may show the area to be mapped as it is seen from the latest satellite image available for that area. Finally, a hybrid view (not shown) may show a view combining both the Map view and the Satellite view, where the street names and other input data is laid on top of the Satellite image.

As shown in FIG. 9B, a search result can be selected to show more information 455 regarding ATM type and payment processing network or other financial entity information 456. The screen may also provide a button to launch a Map view of the location relative to the user (both to be shown on the map) with an icon indicating the location of the ATM 457. Directions could also automatically be provided from the user location to the ATM location or a Directions button 457 could be presented for the user to request directions.

Although, much of the functionality and many of the modules described above are located at the portable electronic device or as part of the digital concierge application installed on the portable electronic device, in other embodiments of the present invention, all of the modules located on the portable electronic device could be present in the application management server computer or elsewhere. Accordingly, the portable electronic device may act as a client and the payment processing network server computer may complete all or some of the processing steps described above for any and all of the service modules.

III. Technical Advantages

Embodiments of the present invention provide a number of technical advantages. For example, grouping the functions described above through modules on a single application in a portable electronic device provides a synergistic effect, resulting in more benefits that are provided by combining the features than each feature provides individually. For example, location based and issuer specific offers can be provided based on an itinerary that is provided to a concierge through the application's email concierge feature. For instance, if a user's travel itinerary (that may have been booked through the digital concierge application using the concierge contact module) suggests that they may be traveling to Boston, then offers including promotions and coupons for discounted goods or services (either issuer and geographically based or merely geographically based) near the suggested location (Boston) can be provided to the user. The entire process can be coordinated through the application which may be easier for the user to keep track of the offers and know what offers are available in a location they may not be familiar with. This may lead to more offers being accepted by users leading to more customer loyalty with the issuer, payment processor, or merchants. Furthermore, all the data related to the offers and other card benefits may be easily accessible on the portable electronic device for easy referencing whether connected to a communications network or not. In another example, issuer specific and location specific offers can be presented to a user no matter where they travel without the user having to communicate with a live person. Therefore, the application may act as a digital concierge service.

Additionally, some embodiments of the present invention may use concierge data associated with insurance claims, service requests, or service reports to deliver cardholder or account holder benefit offers and information relevant to a user's current situation while traveling. For example, a user that reports an air carrier has lost their baggage may have accountholder benefits associated with baggage insurance filtered as the most relevant and shown to the user. Embodiments of the present invention may provide local contact numbers for customer service or through the concierge service for such service requests and may be provided with the benefit of a local concierge that is familiar with the area, merchants, and service providers. Accordingly, a more enjoyable and beneficial interaction may occur leading to better customer service.

Embodiments of the invention provide the technical advantages of providing information to users even when there is no connection to the source of the information and limiting unnecessary data transfer. The application continually updates information related to promotions and offers, local concierge contacts, and other information important to a user and stores the data so that the data can be accessed whether or not the user's portable electronic device has a data connection. For example, when a user is traveling and the concierge has notice of the travel (through access to concierge data including a travel itinerary or by booking the travel through the concierge contact module—e.g. sending and receiving emails including travel details to the concierge service) the user can have local promotions and offers updated on their phone prior to traveling on the plane so that the user can review the information even though the user may not have cellular or data connection. Furthermore, the cardholder benefits that apply to the credit card account can be present for reference by the user at any time without the need for a cellular or data connection. Therefore, no continual connection is required to receive information from the card provider and or local service providers of services or goods. This provides the additional benefit of not requiring an update of the information every time the user wishes to view the information. Instead, the user can opt for the information to only be updated when they manually agree to the update. Furthermore, if no offer data has been updated since the last request (such as the GPS information for the portable electronic device is from the same city or state as previously and there are no new offers available in that area) then there is no need to update the offer information on the phone as it is already stored. This can limit unnecessary transmissions of data between the servers and portable electronic device.

Additionally, some embodiments of the present invention provide a personalized number for contacting a concierge that is determined using location data associated with the portable electronic device. This provides the benefit of connecting the user with a concierge that is familiar with the businesses and services provided in the area. This may result in a faster and more rewarding concierge experience for the user. Furthermore, connecting with a concierge that is localized may ensure that the best possible deals are provided to the user as the concierge may be more familiar with deals that are located in the area where they usually provide services. Additionally, using a local concierge may strengthen the business relationships between the concierge service provider and the local businesses in the area as they become familiar with the concierge service that usually contacts them.

Furthermore, embodiments of the invention may focus on affluent or wealthy cardholders. The application may focus on affluent cardholders because they are the cardholders that most regularly use the promotions, cardholder benefits, and concierge services provided by the application. Affluent cardholders may also travel more and have bigger budgets to spend while traveling. Furthermore, affluent cardholders may need the additional concierge and offer support while traveling. However, the embodiments of the invention could be tailored to any income level and are not limited to affluent cardholders. Therefore, the application could be used with any card product level (the numbers of dollars spent every year may determine the product offered to the user).

IV. Exemplary Computer Systems and Portable Electronic Devices

Figure 10:
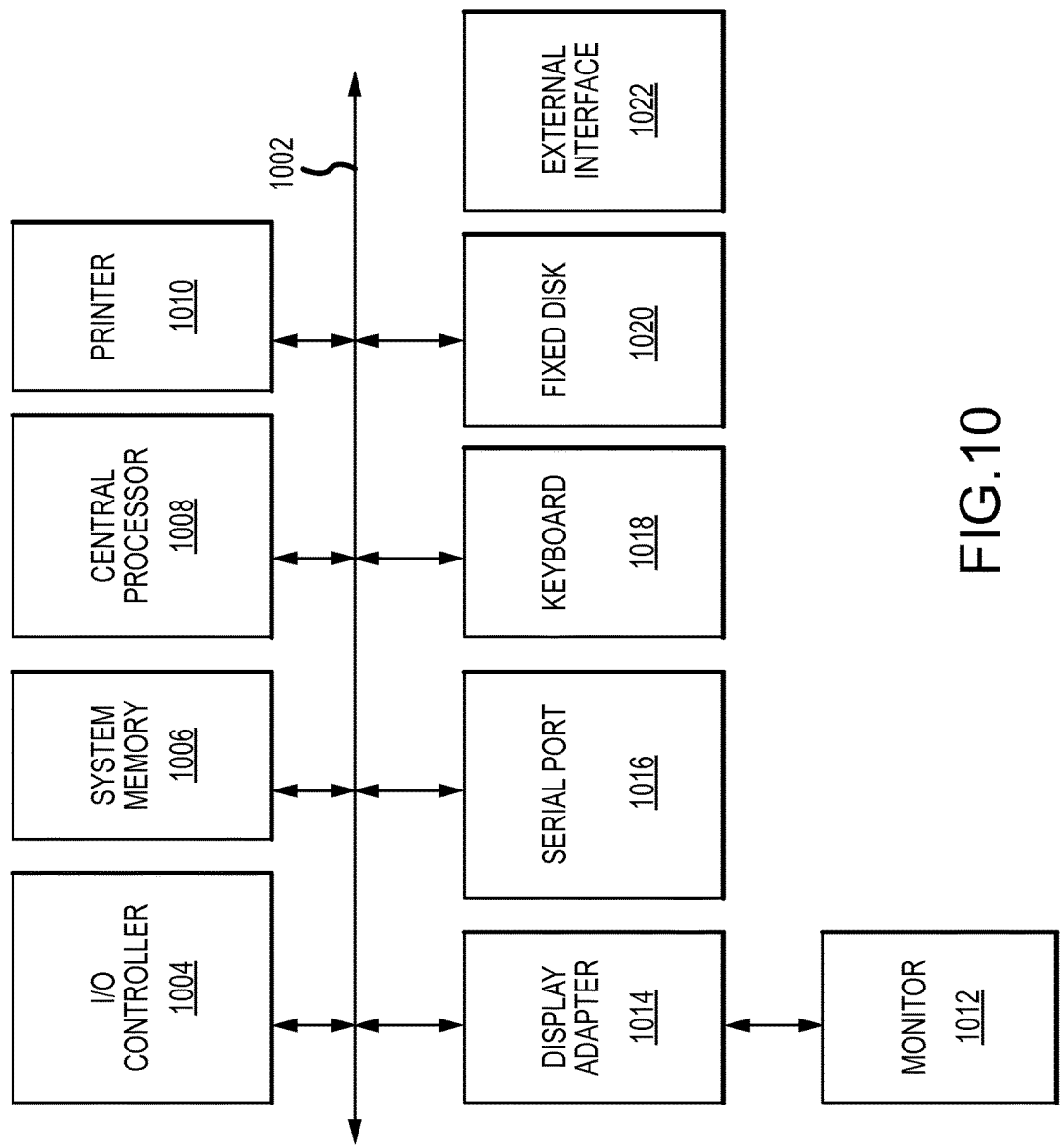
FIG. 10 shows a high level block diagram of a computer system that may be used to implement a server or routing system according to an embodiment of the technology.

FIG. 10 is a high level block diagram of a computer system that may be used to implement any of the entities or components described above. The subsystems shown in FIG. 10 are interconnected via a system bus 1002. Additional subsystems such as a printer 1010, keyboard 1018, fixed disk 1020, and monitor 1012, which is coupled to display adapter 1014. Peripherals and input/output (I/O) devices, which couple to I/O controller 1004, can be connected to the computer system by any number of means known in the art, such as serial port 1084. For example, serial port 1016 or external interface 1022 can be used to connect the computer apparatus to a wide area network such as the Internet, a mouse input device, or a scanner. The interconnection via system bus 1002 allows the central processor 1008 to communicate with each subsystem and to control the execution of instructions from system memory 1006 or the fixed disk 1020, as well as the exchange of information between subsystems. The system memory 1006 and/or the fixed disk 1020 may embody a computer readable medium.

As described, the inventive service may involve implementing one or more functions, processes, operations or method steps. In some embodiments, the functions, processes, operations or method steps may be implemented as a result of the execution of a set of instructions or software code by a suitably programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Figure 11:
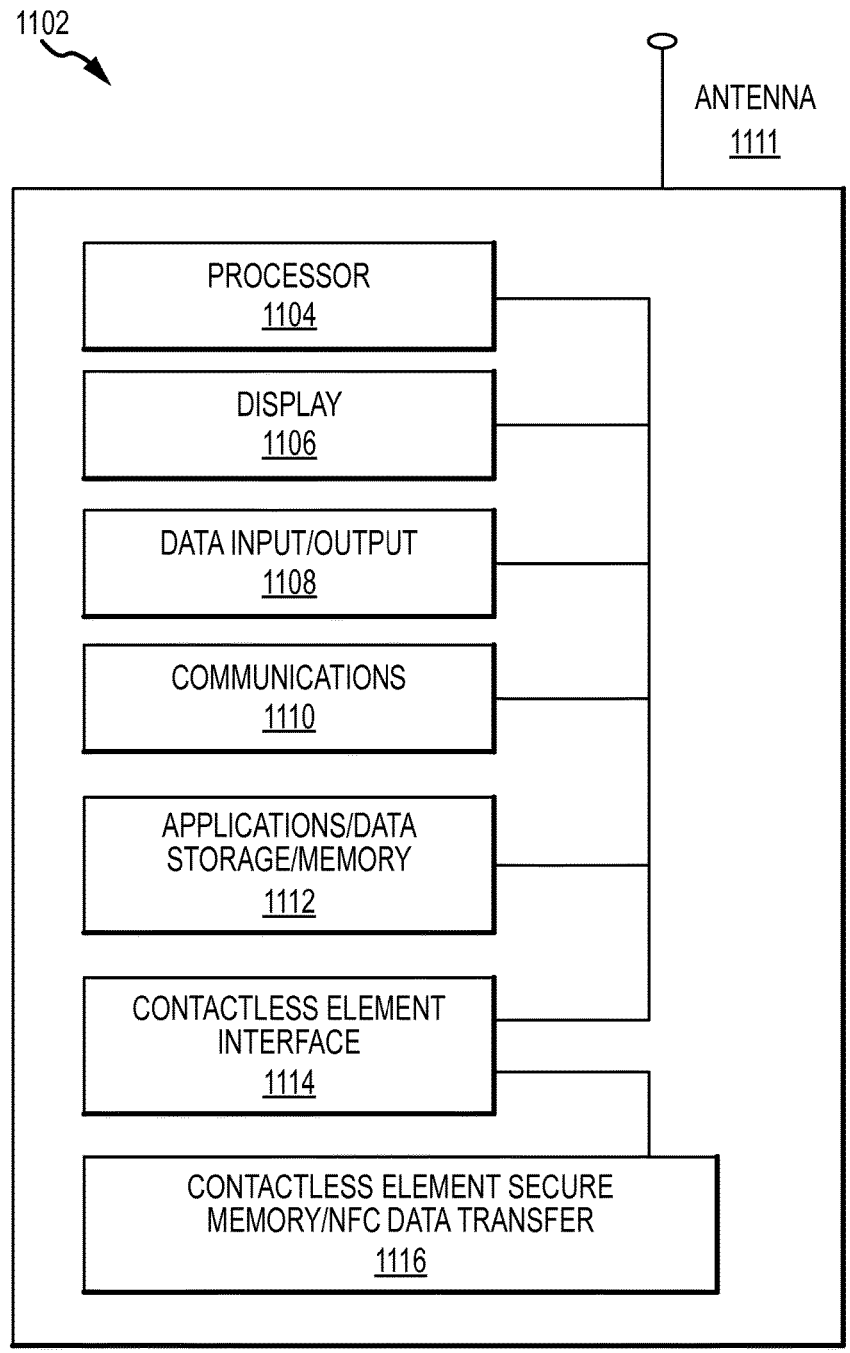
FIG. 11 is a functional block diagram illustrating the primary components of a portable electronic device, such as a mobile phone, that may be used as part of the inventive system and method, in accordance with some embodiments of the present invention.

In embodiments of the present invention, the mobile payment device may include a contactless element capable of communication and data transfer using a near field communication system. As noted, one example is a mobile wireless phone equipped with a NFC capability or other short range communications technology. FIG. 11 is a functional block diagram illustrating the primary components of a portable electronic device, such as a mobile phone that may be used as part of the inventive system and method. As illustrated in FIG. 11, the portable electronic device 1102 may include circuitry that is used to enable certain telephony and other device functions. The functional elements responsible for enabling those functions may include a processor 1104 for executing instructions that implement the functions and operations of the device. The processor 1104 may access data storage 1112 (or another suitable memory region or element) to retrieve instructions or data used in executing the instructions. Data input/output elements 1108 may be used to enable a user to input data (via a microphone or keyboard, for example) or receive output data (via a speaker, for example). Display 1106 may also be used to output data to a user. Communications element 1110 may be used to enable data transfer between the device 1102 and a wireless network (via antenna 1111, for example) to assist in enabling telephony and data transfer functions. The device 1102 may also include contactless element interface 1114 to enable data transfer between contactless element 1116 and other elements of the device, where the contactless element 1116 may include a secure memory and a near field communications or other short range communications data transfer element. The contactless element 1116 may implement a near field communications or other short range communications capability that enables communication and data transfer between the device 1102 and a device reader or POS terminal that is part of a payment transaction processing system.

The data storage 1112 may be a memory that stores data, and may be in any suitable form including a memory chip, etc. The memory may be used to store payment data such as user identification or authentication information, user account information, transaction data, etc. Stored payment data may also include information such as bank/payment account information, bank identification number (BIN), credit or debit card account number information, account balance information, expiration date, consumer information such as name, date of birth, etc. The memory may also be used to store value-add data such as transit data and loyalty program data. Such transit data may include, for example, transit account information, trip counters, fare conversion information, account balance information, etc. Such loyalty program data may include loyalty account information, loyalty points/credits, account balance, loyalty program rules, terms, and conditions, user preferences, etc. Note that such data may instead, or also be stored in a secure data storage element or a similar secure memory that is part of contactless element 1116. As described, data storage 1112 may also contain instructions which when executed by the processor 1104 implement operations or processes that are part of the operation of the device or of applications installed on the device.

It should be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by a communication element of the portable electronic device, a plurality of offers from an application management server over a communication network, the plurality of offers including global offers and local offers;
storing, on a data storage memory of the portable electronic device, the plurality of offers in an offer data database, the offer data database providing access to the plurality of offers without a connection to the application management server via the communication network;
receiving, by the communication element of the portable electronic device over the communication network from a concierge service computer, concierge data including a travel itinerary with at least one of a hotel reservation, restaurant reservation, and travel arrangement, the concierge service computer associated with a concierge service provider that previously scheduled the at least one of the hotel reservation, the restaurant reservation, and the travel arrangement on behalf of a user, wherein the concierge data is associated with the user of the portable electronic device, the concierge service computer different from the application management server, the plurality of offers different from the concierge data including the travel itinerary with at least one of the hotel reservation, the restaurant reservation, and the travel arrangement;
storing, on the data storage memory of the portable electronic device, the concierge data in a concierge data database;
retrieving, from the data storage memory of the portable electronic device in response to a menu selection by the user via a user interface of the portable electronic device, the plurality of offers from the offer data database without using the connection to the application management server via the communication network;

determining, by a processor of the portable electronic device, a current location of the portable electronic device using a GPS receiver of the portable electronic device;

determining, by the processor of the portable electronic device, based on the concierge data, one or more future locations associated with the user of the portable electronic device by interpreting the travel itinerary to identify when and where the user will be located by determining a future location and a future time for each of the at least one hotel reservation, restaurant reservation, and the travel arrangement in the travel itinerary and mapping each of the future locations of the user on a timeline according to the future location and the future time of each of the at least one hotel reservation, restaurant reservation, and travel arrangement in the travel itinerary; and filtering, by the processor of the portable electronic device, without using the connection to the application management server via the communication network, the plurality of offers retrieved from the data storage memory of the portable electronic device according to the current location of the portable electronic device, the one or more future locations, and the timeline by:

determining, by the processor of the portable electronic device, a relevance score for each offer of the plurality of offers retrieved from the data storage memory of the portable electronic device, wherein higher relevance scores are provided to the local offers and to offers associated with the one or more future locations according to the timeline, wherein higher relevance scores are provided to future locations at future times closer to a current time compared to future locations at later future times according to the timeline, wherein the relevance score for each offer of the plurality of offers changes according to the current location of the portable electronic device and the current time; and ordering, by the processor of the portable electronic device, the plurality of offers retrieved from the data storage memory of the portable electronic device according to the relevance score for each offer of the plurality of offers to obtain a filtered plurality of offers;

presenting, via the user interface of the portable electronic device, the filtered plurality of offers to the user of the portable electronic device, wherein offers of the filtered plurality of offers having higher relevance scores are presented before offers having lower relevance scores;

receiving, via the user interface of the portable electronic device, a selection of a selected offer of the filtered plurality of offers from the user;

generating, by the processor of the portable electronic device, a message including the selected offer and a request to redeem or purchase the selected offer;

sending, when the communication element of the portable electronic device has the connection to the application management server, the message including the selected offer and the request to redeem or purchase the selected offer to the application management server over the communication network;

receiving, by the application management server from the portable electronic device, the message including the selected offer and the request to redeem or purchase the selected offer over the communication network; and redeeming, by the application management server, the selected offer for the user by communicating with a provider associated with the selected offer.

2. The method of claim 1, wherein filtering the plurality of offers further comprises filtering the plurality of offers according to an issuer associated with the user of the portable electronic device, and wherein the plurality of offers include promotions and coupons associated with one or more providers.

3. The method of claim 1, wherein the concierge data includes at least one of a service request and a service response associated with the user.

4. The method of claim 1, wherein the offers include benefit information associated with an account of the user, and wherein the concierge data includes a service report.

5. The method of claim 1, further comprising:

transmitting, by the communication element of the portable electronic device, a request for updated offers to the application management server over the communication network in response to a predetermined event;

receiving, by the communication element of the portable electronic device, the updated offers from the application management server over the communication network;

updating, by the processor of the portable electronic device, the plurality of offers with the updated offers to obtain an updated plurality of offers;

filtering, by the processor of the portable electronic device, the updated plurality of offers; and storing, on the data storage memory of the portable electronic device, the updated plurality of offers on the portable electronic device.

6. The method of claim 5, wherein the predetermined event includes launching of the application, powering on the portable electronic device, or lapsing of a predetermined period of time.

7. The method of claim 1 further comprising:

transmitting, by the communication element of the portable electronic device, the selected offer and user information to a social media network server over the communication network, wherein the social media network server shares the selected offer with other social media network users.

8. The method of claim 1 further comprising:

determining, by the processor of the portable electronic device, a local concierge service contact using the current location of the portable electronic device;

presenting, via the user interface of the portable electronic device, contact options to the user to connect to the concierge service;

receiving, via the user interface of the portable electronic device, a contact selection of one of the contact options from the user; and contacting, by the portable electronic device, the concierge service.

9. A system, comprising:

a portable electronic device, comprising:

a processor;

a communication element;

a data storage memory;

a user interface;

a GPS receiver; and a non-transitory computer readable medium comprising computer code executable by the process to perform a method, the method comprising:

receiving, by the communication element, a plurality of offers from an application management server over a communication network, the plurality of offers including global offers and local offers;

storing, on the data storage memory, the plurality of offers in an offer data database, the offer data database providing access to the plurality of offers without a connection to the application management server via the communication network;

receiving, by the communication element, concierge data over the communication network from a concierge service computer, concierge data including a travel itinerary with at least one of a hotel reservation, restaurant reservation, and travel arrangement, the concierge service computer being associated with a concierge service provider that previously scheduled the at least one of the hotel reservation, the restaurant reservation, and the travel arrangement on behalf of a user, wherein the concierge data is associated with the user of the portable electronic device;

storing, on the data storage memory, the concierge data in a concierge data database;

retrieving, from the data storage memory, in response to a menu selection by the user via the user interface, the plurality of offers from the offer data database without using the connection to the application management server via the communication network;

determining, by the processor, based on the concierge data, one or more future locations associated with the user of the portable electronic device by interpreting the travel itinerary to identify when and where the user will be located by determining a future location and a future time for each of the at least one hotel reservation, restaurant reservation, and the travel arrangement in the travel itinerary and mapping each of the future locations of the user on a timeline according to the future location and the future time of each of the at least one hotel reservation, restaurant reservation, and travel arrangement in the travel itinerary; and filtering, by the processor, without using the internet connection, the plurality of offers retrieved from the data storage memory according to the current location of the portable electronic device, the one or more future locations, and the timeline by:

determining, by the processor, a relevance score for each offer of the plurality of offers retrieved from the data storage memory of the portable electronic device, wherein higher relevance scores are provided to the local offers and to offers associated with the one or more future locations according to the timeline, wherein higher relevance scores are provided to future locations at future times closer to a current time compared to future locations at later future times according to the timeline, wherein the relevance score for each offer of the plurality of offers changes according to the current location of the portable electronic device and the current time; and ordering, by the processor, the plurality of offers retrieved from the data storage memory according to the relevance score for each offer of the plurality of offers to obtain a filtered plurality of offers; and presenting, via the user interface, the filtered plurality of offers to the user of the portable electronic device, wherein offers of the filtered plurality of offers having higher relevance scores are presented before offers having lower relevance scores;

receiving, via the user interface, a selection of a selected offer of the filtered plurality of offers from the user;

generating, by the processor, a message including the selected offer and a request to redeem or purchase the selected offer;

sending, when the communication element has the connection to the application management server, the message including the selected offer and the request to redeem or purchase the selected offer to the application management server over the communication network;

the application management server, the application management server comprising a second processor and a second non-transitory computer readable medium comprising second computer code executable by the second processor to perform a second method, the second method comprising:

sending, by the application management server, the plurality of offers to the portable electronic device over the communication network;

receiving, by the application management server from the portable electronic device, the message including the selected offer and the request to redeem or purchase the selected offer over the communication network; and redeeming, by the application management server, the selected offer for the user by communicating with a provider associated with the selected offer; and the concierge service computer, the concierge service computer comprising a third processor and a third non-transitory computer readable medium comprising third computer code executable by the third processor to perform a third method, the concierge service computer different from the application management server, the plurality of offers different from the concierge data including the travel itinerary with at least one of the hotel reservation, the restaurant reservation, and the travel arrangement, the third method comprising:

sending, by the concierge service computer, the concierge data to the portable electronic device.

10. The system of claim 9, wherein the filtering of the plurality of offers further comprises filtering the plurality of offers according to an issuer associated with the user of the portable electronic device, and wherein the plurality of offers include promotions and coupons associated with one or more providers.

11. The system of claim 9, wherein the concierge data includes at least one of a service request and a service response associated with the user.

12. The system of claim 9, wherein the offers include benefit information associated with an account of the user, and wherein the concierge data includes a service report.

13. The system of claim 9, wherein the method further comprises:

transmitting, by the communication element, a request for updated offers to the application management server over the communication network in response to a predetermined event;

receiving, by the communication element, the updated offers from the application management server over the communication network;

updating, by the processor, the plurality of offers with the updated offers to obtain an updated plurality of offers;

filtering, by the processor, the updated plurality of offers; and storing, on the data storage memory, the updated plurality of offers on the portable electronic device.

14. The system of claim 13, wherein the predetermined event includes launching of the application, powering on the portable electronic device, or lapsing of a predetermined period of time.

15. The system of claim 9 wherein the method further comprises:

transmitting, by the communication element, the selected offer and user information to a social media network server over the communication network, wherein the social media network server shares the selected offer with other social media network users.

16. The system of claim 9, wherein the method further comprises:

determining, by the processor, a local concierge service contact using the current location of the portable electronic device;

presenting, via the user interface, contact options to the user to connect to the concierge service;

receiving, via the user interface, a contact selection of one of the contact options from the user; and contacting, by the portable electronic device, the concierge service.

17. The method of claim 1, wherein the plurality of offers further include offers associated with an account issuer, the account issuer being associated with the user of the portable electronic device.

18. The method of claim 17, wherein filtering the plurality of offers includes:

allocating higher relevance scores to the offers associated with the account issuer.

19. The method of claim 18, wherein the one or more future locations includes a first future location associated with a first time and a second future location associated with a second time, wherein the first time is before the second time, and wherein filtering the plurality of offers further includes:

allocating, based on the first time and the second time, higher relevance scores to offers associated with the first future location than offers associated with the second future location.

20. The method of claim 1, wherein the filtering of the plurality of offers occurs without the portable electronic device being connected to the communication network.

* * * * *